(12) United States Patent
Kundrat et al.

(10) Patent No.: US 12,122,948 B2
(45) Date of Patent: Oct. 22, 2024

(54) RAPID THICKENING OF AMINOSILICONES TO PROMOTE EMULSION STABILITY AND ADHESION OF UV-CURABLE QUANTUM DOT ENHANCEMENT FILM EMULSIONS

(71) Applicant: Shoei Chemical Inc., Tokyo (JP)

(72) Inventors: James Kundrat, San Francisco, CA (US); David Olmeijer, San Francisco, CA (US)

(73) Assignee: SHOEI CHEMICAL INC., Tokyo (JP)

(*) Notice: Subject to any disclaimer, the term of this patent is extended or adjusted under 35 U.S.C. 154(b) by 0 days.

(21) Appl. No.: 18/112,694

(22) Filed: Feb. 22, 2023

(65) Prior Publication Data

US 2023/0203368 A1  Jun. 29, 2023

Related U.S. Application Data

(63) Continuation of application No. 15/885,309, filed on Jan. 31, 2018, now abandoned.

(60) Provisional application No. 62/452,766, filed on Jan. 31, 2017.

(51) Int. Cl.
| | | |
|---|---|---|
| *C09K 11/02* | (2006.01) | |
| *C08K 3/30* | (2006.01) | |
| *C09D 5/22* | (2006.01) | |
| *C09D 183/08* | (2006.01) | |
| *C09K 11/70* | (2006.01) | |
| *C09K 11/88* | (2006.01) | |
| *B82Y 20/00* | (2011.01) | |
| *B82Y 40/00* | (2011.01) | |
| *C08K 3/32* | (2006.01) | |

(52) U.S. Cl.
CPC ............. *C09K 11/025* (2013.01); *C09D 5/22* (2013.01); *C09D 183/08* (2013.01); *C09K 11/02* (2013.01); *C09K 11/70* (2013.01); *C09K 11/883* (2013.01); *B82Y 20/00* (2013.01); *B82Y 40/00* (2013.01); *C08K 3/30* (2013.01); *C08K 3/32* (2013.01); *C08K 2201/011* (2013.01); *Y10S 977/774* (2013.01); *Y10S 977/783* (2013.01); *Y10S 977/892* (2013.01); *Y10S 977/95* (2013.01)

(58) Field of Classification Search
CPC ....... C09K 11/02; C09K 11/025; C09K 11/70; C09K 11/883; C09D 5/22; C09D 5/1656; C09D 183/08; C08K 3/30; C08K 3/32; C08K 2201/011; B82Y 20/00; B82Y 40/00; Y10S 977/778; Y10S 977/774; Y10S 977/783; Y10S 977/892
See application file for complete search history.

(56) References Cited

U.S. PATENT DOCUMENTS

| | | | |
|---|---|---|---|
| 2009/0098057 A1 | 4/2009 | Zheng et al. | |
| 2010/0276638 A1* | 11/2010 | Liu | ..................... H01L 31/0272 556/9 |
| 2013/0345458 A1* | 12/2013 | Freeman | ................ C08G 77/38 556/439 |
| 2014/0291608 A1 | 10/2014 | Sargent et al. | |
| 2018/0223182 A1 | 8/2018 | Kundrat et al. | |

FOREIGN PATENT DOCUMENTS

| | | |
|---|---|---|
| EP | 2980126 A1 | 2/2016 |
| WO | WO 2015/013247 A1 | 1/2015 |
| WO | WO 2016/092805 A1 | 6/2016 |

OTHER PUBLICATIONS

International Search Report and Written Opinion for related International Application No. PCT/US2018/016154, European Patent Office, Netherlands, mailed Apr. 16, 2018, 14 pages.

\* cited by examiner

*Primary Examiner* — Matthew E. Hoban
*Assistant Examiner* — Lynne Edmondson
(74) *Attorney, Agent, or Firm* — Alleman Hall & Tuttle LLP

(57) ABSTRACT

The present invention provides nanostructure compositions and methods of producing nanostructure compositions. The nanostructure compositions comprise a population of nanostructures, an aminosilicone polymer, an organic resin, and a cation. The present invention also provides nanostructure films comprising a nanostructure layer and methods of making nanostructure films.

20 Claims, 4 Drawing Sheets

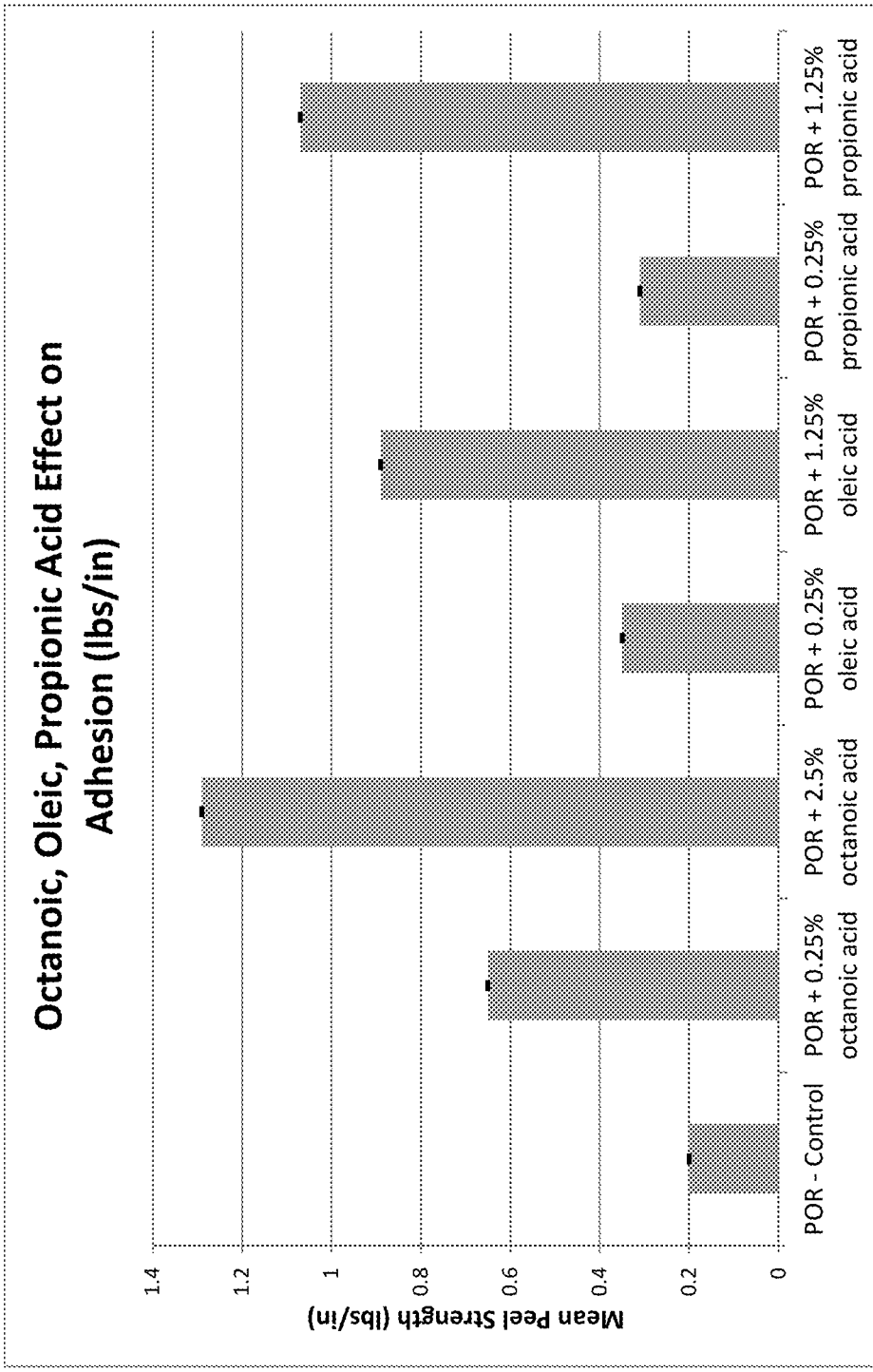

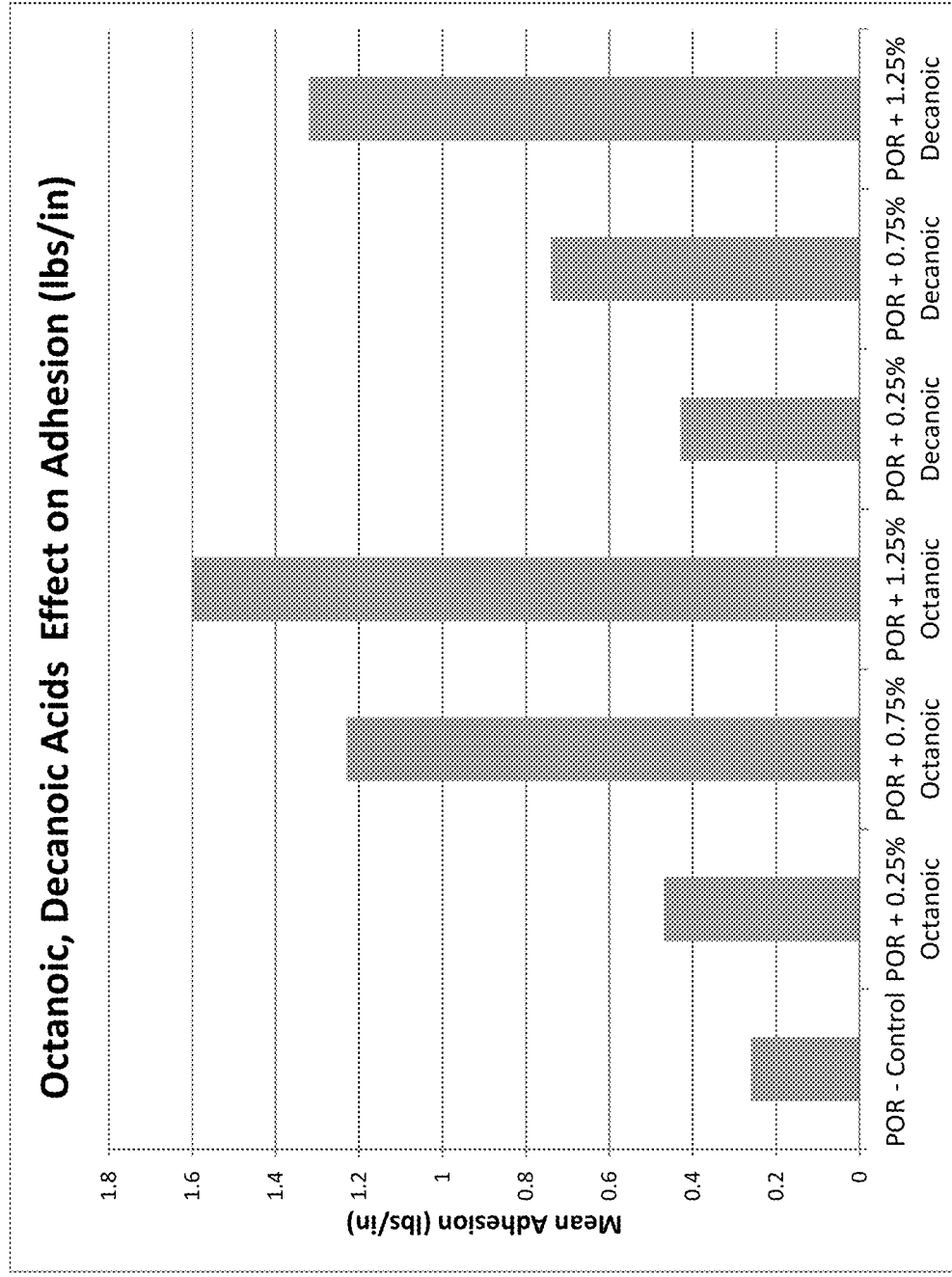

RAPID THICKENING OF AMINOSILICONES TO PROMOTE EMULSION STABILITY AND ADHESION OF UV-CURABLE QUANTUM DOT ENHANCEMENT FILM EMULSIONS

RELATED APPLICATIONS

This application is a divisional of U.S. patent application Ser. No. 15/885,309, filed Jan. 31, 2018, now pending, which claims priority to U.S. Provisional Patent Application No. 62/452,766, filed Jan. 31, 2017, now expired, all of which are incorporated herein by reference in their entireties.

BACKGROUND OF THE INVENTION

Field of the Invention

The present invention provides nanostructure compositions and methods of producing nanostructure compositions. The nanostructure compositions comprise a population of nanostructures, an aminosilicone polymer, an organic resin, and a cation to increase the viscosity of the composition. The present invention also provides nanostructure films comprising a nanostructure layer and methods of making nanostructure films.

Background of the Invention

Optical films used in the display industry are frequently composed of multiple layers containing materials of different chemical compositions. Adhesion between these layers is critical to maintain the structure of films throughout handling, processing, and final use.

Delamination of two or more film layers is due to adhesive failure which causes the layers to split apart. Delamination of two or more film layers renders the film unusable and cannot be repaired.

Emulsions are mixtures of two or more immiscible liquids that can be used to generate translucent films capable of scattering light. The two phases of an emulsion are chemically dissimilar; it is this difference in chemical structure that prevents miscibility and allows the mixture to remain in two phases and thus form an emulsion. Unfortunately, this difference in chemical structure can also pose problems for adhesion.

One problem due to difference in chemical structure is that one phase may adhere well to other layers while another phase may adhere poorly. A UV-curable resin system containing pentaerythritol tetrakis (3-mercaptopropionate) and triallyl triazine trione is optically clear and adheres well to barrier films containing a surface primer. The addition of quantum dots in aminosilicone to this resin forms an emulsion that, when coated, forms a translucent film capable of scattering light. But, the emulsified coating shows very poor adhesion and is prone to delamination—even when very little force is used. It is believed that aminosilicone at the film-coating interface interferes with adhesion.

Unstable emulsions degrade over time. Droplets can flocculate, coalesce, and sediment, causing changes to the physical and optical properties of the liquid system. Emulsions are most commonly stabilized by the addition of surfactants. Surfactants are added to stabilize the emulsion by building at the interface between the two phases and preventing flocculation and coalescence. While it may be possible to find a surfactant to stabilize an aminosilicone in a resin, surfactants have not been effective in increasing adhesion.

A need exists to prepare nanostructure solutions and/or resin mixes that have improved stability and result in improved optical properties when used to prepare a nanostructure film.

BRIEF SUMMARY OF THE INVENTION

The present invention is directed to a nanostructure composition, comprising:
(a) at least one population of nanostructures;
(b) at least one aminosilicone polymer; and
(c) at least one organic resin;
wherein between about 1% and 100% of the amine groups on the aminosilicone polymer are complexed to a cation.

In some embodiments, the nanostructure composition comprises between one and five populations of nanostructures. In some embodiments, the nanostructure composition comprises two populations of nanostructures.

In some embodiments, the at least one population of nanostructures contains a core selected from the group consisting of InP, InZnP, InGaP, CdSe, CdS, CdSSe, CdZnSe, CdZnS, ZnSe, ZnSSe, InAs, InGaAs, or InAsP.

In some embodiments, the nanostructure composition comprises as a weight percentage between about 0.0001% and about 2% of the at least one population of nanostructures.

In some embodiments, the nanostructure composition comprises between one and five aminosilicone polymers. In some embodiments, the nanostructure composition comprises two aminosilicone polymers.

In some embodiments, the nanostructure composition comprises as a weight percentage between about 0.01% and about 50% of the at least one aminosilicone polymer.

In some embodiments, the cation is a proton of an acid. In some embodiments the acid is selected from the group consisting of oleic acid, diisooctylphosphinic acid, oxalic acid, octanoic acid, propionic acid, and decanoic acid.

In some embodiments, the cation is a metal ion of a metal ion salt or complex. In some embodiments, the metal ion is selected from the group consisting of $Li^+$, $Na^+$, $K^+$, $Mg^{2+}$, and $Al^{3+}$.

In some embodiments, the nanostructure composition comprises between one and five organic resins. In some embodiments, the nanostructure composition comprises two organic resins.

In some embodiments, the at least one organic resin is a thermosetting resin or a UV curable resin.

In some embodiments, the at least one organic resin is a UV curable resin.

In some embodiments, the at least one organic resin is a mercaptofunctional compound.

In some embodiments, the at least one organic resin is a isocyanate, an epoxy, or an unsaturated compound.

In some embodiments, the nanostructure composition comprises as a weight percentage between about 5% and about 50% of the at least one organic resin.

In some embodiments, between about 1% and about 40% of the amine groups in the aminosilicone polymer are complexed to a cation.

In some embodiments, the nanostructure composition comprises 2 populations of nanostructures, 2 aminosilicone polymers, 1 acid, and 2 organic resins.

In some embodiments, the nanostructures are quantum dots.

In some embodiments, the nanostructure composition comprises a population of nanostructures comprising a InP core and/or a population of nanostructures comprising a CdSe core.

In some embodiments, a molded article comprising the nanostructure composition is provided. In some embodiments, the molded article is a film, a substrate for a display, or a light emitting diode. In some embodiments, the molded article is a film.

The present invention is also directed to a method of preparing a nanostructure composition, the method comprising:
(a) providing a composition comprising at least one population of nanostructures and at least one aminosilicone polymer;
(b) admixing at least one organic resin with the composition of (a); and
(c) admixing at least one acid, metal ion salt, or metal ion complex salt with the composition obtained in (b), wherein the weight percentage of the acid, metal ion salt, or metal ion complex salt admixed with the nanostructure composition is between about 0.1% and about 5% of the total weight of the nanostructure composition.

In some embodiments, a composition comprising two populations of nanostructures is provided in (a).

In some embodiments, the at least one population of nanostructures contains a core selected from the group consisting of InP, InZnP, InGaP, CdSe, CdS, CdSSe, CdZnSe, CdZnS, ZnSe, ZnSSe, InAs, InGaAs, or InAsP.

In some embodiments, the weight percentage of the at least one population of nanostructures is between about 0.0001% and about 2% of the total weight of the nanostructure composition.

In some embodiments, a composition comprising between one and five aminosilicone polymers, inclusive, is provided in (a). In some embodiments, a composition comprising two aminosilicone polymers is provided in (a).

In some embodiments, the weight percentage of the at least one aminosilicone polymer is between about 0.01% and about 50% of the total weight of the nanostructure composition.

In some embodiments, the admixing in (b) is at an agitation rate between 100 rpm and 10,000 rpm.

In some embodiments, the admixing in (b) is for a time of between 1 minutes and 24 hours.

In some embodiments, two organic resins are admixed in (b).

In some embodiments, the at least one organic resin is a thermosetting resin or a UV curable resin.

In some embodiments, the at least one organic resin is a UV curable resin.

In some embodiments, the at least one organic resin is a mercaptofunctional compound.

In some embodiments, the at least one organic resin is a isocyante, an epoxy, or an unsaturated compound.

In some embodiments, the weight percentage of the at least one organic resin is between about 5% and about 50% of the total weight of the nanostructure composition.

In some embodiments, the admixing in (c) is at an agitation rate between 100 rpm and 10,000 rpm.

In some embodiments, the admixing in (c) is for a time of between 1 minutes and 24 hours.

In some embodiments, one acid is admixed in (c).

In some embodiments, the admixing in (c) of the at least one acid, metal ion salt, or metal ion complex salt causes an increase in the viscosity of the aminosilicone polymer in the nanostructure composition. In some embodiments, the increase in viscosity of the aminosilicone polymer in the nanostructure composition is between about 10% and about 5000%.

In some embodiments, the acid is an organic acid. In some embodiments, the acid is a carboxylic acid. In some embodiments, the acid is selected from the consisting of oleic acid, diisooctylphosphinic acid, oxalic acid, octanoic acid, propionic acid, and decanoic acid.

In some embodiments, one metal ion salt is admixed in (c). In some embodiments, the metal ion salt is selected from the group consisting of a $Li^+$, $Na^+$, $K^+$, $Mg^{2+}$, and $Al^{3+}$ salt.

In some embodiments, the weight percentage of the at least one acid, metal ion salt, or metal ion complex salt admixed with the nanostructure composition is between about 0.5% and about 5% of the total weight of the nanostructure composition.

In some embodiments, the method further comprises curing the composition of (c) using thermal curing or UV curing.

In some embodiments, the nanostructures are quantum dots. In some embodiments, the quantum dots are InP and/or CdSe quantum dots.

In some embodiments, the composition in (a) is admixed with 3-mercaptopropionate and triallyl triazine trione, and the acid in (c) is diisooctylphosphonic acid.

The present invention is also directed to a method of preparing a nanostructure composition, the method comprising:
(a) providing a composition comprising at least one population of nanostructures, at least one aminosilicone polymer, and at least at least one organic resin; and
(b) admixing at least one acid, metal ion salt, or metal ion complex salt with the composition of (a), wherein the weight percentage of the at least one acid, metal ion salt, or metal ion complex salt admixed with the nanostructure composition is between about 0.1% and about 5% of the total weight of the nanostructure composition.

In some embodiments, a composition comprising two populations of nanostructures is provided in (a).

In some embodiments, the at least one population of nanostructures contains a core selected from the group consisting of InP, InZnP, InGaP, CdSe, CdS, CdSSe, CdZnSe, CdZnS, ZnSe, ZnSSe, InAs, InGaAs, or InAsP.

In some embodiments, the weight percentage of the at least one population of nanostructures is between 0.0001% and 2% of the total weight of the nanostructure composition.

In some embodiments, a composition comprising between one and five aminosilicone polymers, inclusive, is provided in (a). In some embodiments, a composition comprising two aminosilicone polymers is provided in (a).

In some embodiments, the weight percentage of the at least one aminosilicone polymer is between 0.01% and 50% of the total weight of the nanostructure composition.

In some embodiments, a composition comprising two organic resins is provided in (a).

In some embodiments, the at least one organic resin is a thermosetting resin or a UV curable resin.

In some embodiments, the at least one organic resin is a UV curable resin.

In some embodiments, the at least one organic resin is a mercaptofunctional compound.

In some embodiments, the at least one organic resin is a isocyanate, an epoxy, or an unsaturated compound.

In some embodiments, the weight percentage of the at least one organic resin is between 5% and 50% of the total weight of the nanostructure composition.

In some embodiments, the admixing in (b) is at an agitation rate between 100 rpm and 10,000 rpm.

In some embodiments, the admixing in (b) is for a time of between 1 minutes and 24 hours.

In some embodiments, one acid is admixed in (b).

In some embodiments, the acid is an organic acid. In some embodiments, the acid is a carboxylic acid. In some embodiments, the acid is selected from the group consisting of oleic acid, diisooctylphosphinic acid, oxalic acid, octanoic acid, propionic acid, and decanoic acid.

In some embodiments, one metal ion salt is admixed in (b). In some embodiments, the metal ion salt is selected from the group consisting of a $Li^+$, $Na^+$, $K^+$, $Mg^{2+}$, and $Al^{3+}$ salt.

In some embodiments, the weight percentage of the at least one acid, metal ion salt, or metal ion complex salt is between 0.5% and 5% of the total weight of the nanostructure composition.

In some embodiments, the admixing in (b) of the at least one acid, metal ion salt, or metal ion complex salt causes an increase in the viscosity of the aminosilicone in the nanostructure composition. In some embodiments, the increase in viscosity of the aminosilicone in the nanostructure composition is between about 10% and about 5000%.

In some embodiments, the method further comprises curing the composition of (b) using thermal curing or UV curing.

In some embodiments, the nanostructures are quantum dots. In some embodiments, the quantum dots are InP and/or CdSe quantum dots.

The present invention is also directed to a nanostructure film layer comprising:
 (a) at least one population of nanostructures;
 (b) at least one aminosilicone polymer; and
 (c) at least one organic resin;
wherein the nanostructure film layer has a mean peel strength of between about 0.35 lbs/in and about 5 lbs/in, and wherein between about 1% and about 100% of the amine groups in the aminosilicone polymer are complexed to a cation.

In some embodiments, the nanostructure film layer comprises between one and five populations of nanostructures.

In some embodiments, the nanostructure film layer comprises two populations of nanostructures.

In some embodiments, the at least one population of nanostructures contains a core selected from the group consisting of InP, InZnP, InGaP, CdSe, CdS, CdSSe, CdZnSe, CdZnS, ZnSe, ZnSSe, InAs, InGaAs, or InAsP.

In some embodiments, the at least one population of nanostructures comprises as a weight percentage between about 0.0001% and about 2% of the total weight of the nanostructure film layer.

In some embodiments, the nanostructure film layer comprises between one and five aminosilicone polymers. In some embodiments, the nanostructure film layer comprises two aminosilicone polymers.

In some embodiments, the at least one aminosilicone polymer comprises as a weight percentage between about 0.01% and about 50% of the total weight of the nanostructure film layer.

In some embodiments, between about 1% and about 40% of the amine groups in the aminosilicone polymer are complexed to a cation.

In some embodiments, the nanostructure film layer comprises between one and five organic resins. In some embodiments, the nanostructure film layer comprises two organic resins.

In some embodiments, the at least one organic resin is a thermosetting resin or a UV curable resin.

In some embodiments, the at least one organic resin is a UV curable resin.

In some embodiments, the at least one organic resin is a mercaptofunctional compound.

In some embodiments, the at least one organic resin is a isocyanate, an epoxy, or an unsaturated compound.

In some embodiments, the at least one organic resin comprises as a weight percentage between 5% and 50% of the total weight of the nanostructure composition.

In some embodiments, the nanostructure film layer has a mean peel strength of between about 0.5 lbs/in and about 5 lbs/in.

In some embodiments, the nanostructure film layer has a mean peel strength of between about 0.75 lbs/in and about 5 lbs/in.

In some embodiments, the nanostructure film layer comprises 2 populations of nanostructures, 2 aminosilicone polymers, 1 acid, and 2 organic resins.

In some embodiments, the nanostructures are quantum dots. In some embodiments, the quantum dots are InP and/or CdSe quantum dots.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements.

FIG. 3 is a graph showing the mean peel strength of a quantum dot film layer prepared with no acid (control), a quantum dot film layer prepared with 0.25% octanoic acid, a quantum dot film layer prepared with 2.5% octanoic acid, a quantum dot film layer prepared with 0.25% oleic acid, a quantum dot film layer prepared with 1.25% oleic acid, a quantum dot film layer prepared with 0.25% propionic acid, and a quantum dot film layer prepared with 1.25% propionic acid.

FIG. 4 is a graph showing the mean peel strength of a quantum dot film layer prepared with no acid (control), a quantum dot film layer prepared with 0.25% octanoic acid, a quantum dot film layer prepared with 0.75% octanoic acid, a quantum dot film layer prepared with 1.25% octanoic acid, a quantum dot film layer prepared with 0.25% decanoic acid, a quantum dot film layer prepared with 0.75% decanoic acid, and a quantum dot film layer prepared with 1.25% decanoic acid.

DETAILED DESCRIPTION OF THE INVENTION

Figure 1:
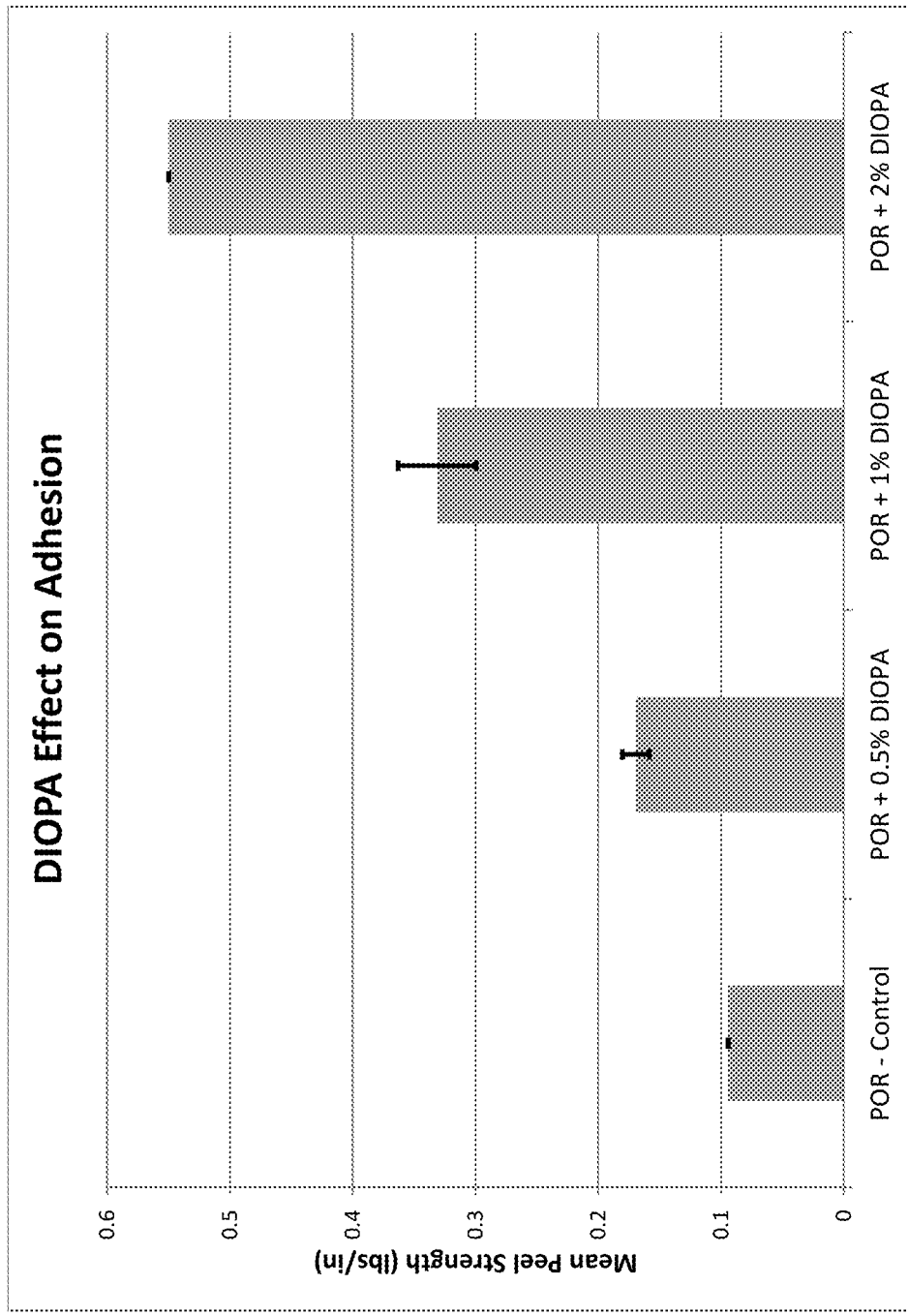
FIG. 1 is a graph showing the mean peel strength of a quantum dot film layer prepared with no acid (control), a quantum dot film layer prepared with 0.5% diisooctylphosphinic (DIOPA) acid, a quantum dot film layer prepared with 1% DIOPA, and a quantum dot film layer prepared with 2% DIOPA.

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in practice for testing, the preferred materials and methods are described herein. Accordingly, the terminology used herein is for the purpose of describing particular embodiments only, and is not intended to be limiting.

As used in this specification and the appended claims, the singular forms "a," "an," and "the" include plural referents unless the context clearly dictates otherwise. Thus, for example, reference to "a nanostructure" includes a plurality of such nanostructures, and the like.

The term "about" as used herein indicates the value of a given quantity varies by 10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more faces of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from transmission electron microscopy (TEM) images of nanocrystals before and after a shell synthesis.

As used herein, the term "solubilizing group" refers to a substantially non-polar group that has a low solubility in water and high solubility in organic solvents such as hexane, pentane, toluene, benzene, diethylether, acetone, ethyl acetate, dichloromethane (methylene chloride), chloroform, dimethylformamide, and N-methylpyrrolidinone. In some embodiments, the solubilizing group is a long-chain alkyl, a long-chain heteroalkyl, a long-chain alkenyl, a long-chain alkynyl, a cycloalkyl, or an aryl.

As used herein, the term "stable" refers to a mixture or composition that resists change or decomposition due to internal reaction or due to the action of air, heat, light, pressure, or other natural conditions.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

As used herein, the term "functional group equivalent weight" (FGEW) is used to determine the ratio of the reactive functional groups in a polymer. The FGEW of a polymer is defined as the ratio of the number average molecular weight (NAMW) to the number of functional groups in the polymer (n). It is the weight of a polymer that contains one formula weight of the functional group. The FGEW is calculated using end-group analysis by counting the number of reactive functional groups and dividing into the number average molecular weight:

FGEW=NAMW/$n$ where n=the number of reactive functional groups in the monomer.

"Alkyl" as used herein refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

"Alkenyl" as used herein refers to a monovalent group derived from a straight- or branched-chain hydrocarbon moiety having at least one carbon-carbon double bond formed by the removal of a single hydrogen atom. In some embodiments, the alkenyl group contains 2-20 carbon atoms and is a $C_{2-20}$ alkenyl. In some embodiments, the alkenyl group contains 2-15 carbon atoms and is a $C_{2-15}$ alkenyl. In some embodiments, the alkenyl group contains 2-10 carbon atoms and is a $C_{2-10}$ alkenyl. In some embodiments, the alkenyl group contains 2-8 carbon atoms and is a $C_{2-8}$ alkenyl. In some embodiments, the alkenyl group contains 2-5 carbons and is a $C_{2-5}$ alkenyl. Alkenyl groups include, for example, ethenyl, propenyl, butenyl, and 1-methyl-2-buten-1-yl.

"Alkynyl" as used herein refers to a monovalent group derived from a straight- or branched-chain hydrocarbon having at least one carbon-carbon triple bond formed by the removal of a single hydrogen atom. In some embodiments, the alkynyl group contains 2-20 carbon atoms and is a $C_{2-20}$ alkynyl. In some embodiments, the alkynyl group contains 2-15 carbon atoms and is a $C_{2-15}$ alkynyl. In some embodiments, the alkynyl group contains 2-10 carbon atoms and is a $C_{2-10}$ alkynyl. In some embodiments, the alkynyl group contains 2-8 carbon atoms and is a $C_{2-8}$ alkynyl. In some embodiments, the alkynyl group contains 2-5 carbons and is a $C_{2-5}$ alkynyl. Representative alkynyl groups include, but are not limited to, ethynyl, 2-propynyl (propargyl), and 1-propynyl.

"Alkylamino" as used herein, refers to a "substituted amino" of the formula (—$NR^K_2$), wherein $R^K$ is, independently, a hydrogen or an optionally substituted alkyl group, as defined herein, and the nitrogen moiety is directly attached to the parent molecule.

"Heteroalkyl" as used herein, refers to an alkyl moiety which is optionally substituted with one or more functional groups, and that contains one or more oxygen, sulfur, nitrogen, phosphorus, or silicon atoms, e.g., in place of carbon atoms.

"Cycloalkyl" as used herein, refers to a monovalent or divalent group of 3 to 8 carbon atoms, preferably 3 to 5 carbon atoms derived from a saturated cyclic hydrocarbon. Cycloalkyl groups can be monocyclic or polycyclic. Cycloalkyl can be substituted by $C_{1-3}$ alkyl groups or halogens.

"Carboxyalkyl" as used herein, refers to a carboxylic acid group (—COOH) appended to a lower alkyl radical.

"Heterocycloalkyl" as used herein, refers to cycloalkyl substituents that have from 1 to 5, and more typically from 1 to 4 heteroatoms in the ring structure. Suitable heteroatoms employed in compounds are nitrogen, oxygen, and sulfur. Representative heterocycloalkyl moieties include, for example, morpholino, piperazinyl, piperidinyl, and the like.

The term "alkylene," as used herein, alone or in combination, refers to a saturated aliphatic group derived from a straight or branched chain saturated hydrocarbon attached at two or more positions, such as methylene (—$CH_2$—). Unless otherwise specified, the term "alkyl" may include "alkylene" groups.

"Aryl" as used herein refers to unsubstituted monocyclic or bicyclic aromatic ring systems having from six to fourteen carbon atoms, i.e., a $C_{6-14}$ aryl. Non-limiting exemplary aryl groups include phenyl, naphthyl, phenanthryl, anthracyl, indenyl, azulenyl, biphenyl, biphenylenyl, and fluorenyl groups. In one embodiment, the aryl group is a phenyl or naphthyl.

"Heteroaryl" or "heteroaromatic" as used herein refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen, and sulfur. In one embodiment, the heteroaryl contains 1, 2, 3, or 4 heteroatoms independently selected from the group consisting of oxygen, nitrogen, and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

Unless clearly indicated otherwise, ranges listed herein are inclusive.

A variety of additional terms are defined or otherwise characterized herein.

Nanostructure Composition

In some embodiments, the present invention provides a nanostructure composition comprising:
  (a) at least one population of nanostructures;
  (b) at least one aminosilicone polymer; and
  (c) at least one organic resin;
wherein between about 1% and about 100% of the amine groups in the aminosilicone polymer are complexed to a cation.

In some embodiments, the nanostructure composition further comprises a solvent.

In some embodiments, the nanostructure is a quantum dot.

In some embodiments, the cation is a proton, e.g. from an acid. In some embodiments, the cation is a metal ion or a metal ion complex, e.g., from a metal ion or metal ion complex salt.

In some embodiments, the present invention provides a nanostructure film kit comprising:
  (a) a first composition comprising at least one population of nanostructures and at least one aminosilicone polymer;
  (b) a second composition comprising at least one organic resin;
  (c) a third composition comprising at least one acid and/or metal ion or metal ion complex salt; and
  (d) instructions for preparing a nanostructure film.

In some embodiments, the nanostructure is a quantum dot.

In some embodiments, the present invention provides a nanostructure film kit comprising:
  (a) a first composition comprising at least one population of nanostructures, at least one aminosilicone polymer, and at least one organic resin;
  (b) a second composition comprising at least one acid and/or metal ion or metal ion complex salt; and
  (c) instructions for preparing a nanostructure film.

In some embodiments, the nanostructure film kit further comprises a solvent.

In some embodiments, the nanostructure is a quantum dot.

Nanostructure Film Layer

In some embodiments, the present invention provides a nanostructure film layer comprising:
  (a) at least one population of nanostructures;
  (b) at least one aminosilicone polymer; and
  (c) at least one organic resin;
wherein the nanostructure film layer has a mean peel strength of between about 0.35 lbs/in and about 5 lbs/in, and wherein between about 1% and about 100% of the amine groups in the aminosilicone polymer are complexted to a cation.

In some embodiments, the nanostructure is a quantum dot.

In some embodiments, the cation is a proton, e.g. from an acid. In some embodiments, the cation is a metal ion or a metal ion complex, e.g., from a metal ion or metal ion complex salt.

Nanostructure Molded Article

In some embodiments, the present invention provides a nanostructure molded article comprising:
(a) at least one population of nanostructures;
(b) at least one aminosilicone polymer; and
(c) at least one organic resin; and
wherein the molded article is stable for between about 3 months and 10 years, and wherein between about 1% and about 100% of the amine groups in the aminosilicone polymer are complexed to a cation.

In some embodiments, the molded article is a film, a substrate for a display, or a light emitting diode.

In some embodiments, the cation is a proton, e.g. from an acid. In some embodiments, the cation is a metal ion or a metal ion complex, e.g., from a metal ion or metal ion complex salt.

In some embodiments, the nanostructure is a quantum dot.

In some embodiments, the present invention provides a nanostructure film comprising:
(a) a first barrier layer;
(b) a second barrier layer; and
(c) a nanostructure layer between the first barrier layer and the second barrier layer, wherein the nanostructure layer comprises at least one population of nanostructures; at least one aminosilicone polymer; and at least one organic resin;
wherein between about 1% and about 100% of the amine groups on the aminosilicone polymer are complexed to a cation and wherein the nanostructure layer has a mean peel strength of between about 0.35 lbs/in and about 5 lbs/in.

In some embodiments, the nanostructure is a quantum dot.

In some embodiments, the cation is a proton, e.g. from an acid. In some embodiments, the cation is a metal ion or a metal ion complex, e.g., from a metal ion or metal ion complex salt.

Quantum Dots

The quantum dots (or other nanostructures) for use in the present invention can be produced from any suitable material, suitably an inorganic material, and more suitably an inorganic conductive or semiconductive material. Suitable semiconductor materials include any type of semiconductor, including Group II-VI, Group III-V, Group IV-VI, and Group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2CO$, and combinations thereof.

The synthesis of Group II-VI nanostructures has been described in U.S. Pat. Nos. 6,225,198, 6,322,901, 6,207,229, 6,607,829, 6,861,155, 7,060,243, 7,125,605, 7,374,824, 7,566,476, 8,101,234, and 8,158,193 and in U.S. Patent Appl. Publication Nos. 2011/0262752 and 2011/0263062. In some embodiments, the core is a Group II-VI nanocrystal selected from the group consisting of ZnO, ZnSe, ZnS, ZnTe, CdO, CdSe, CdS, CdTe, HgO, HgSe, HgS, and HgTe. In some embodiments, the core is a nanocrystal selected from the group consisting of ZnSe, ZnS, CdSe, or CdS.

Although Group II-VI nanostructures such as CdSe and CdS quantum dots can exhibit desirable luminescence behavior, issues such as the toxicity of cadmium limit the applications for which such nanostructures can be used. Less toxic alternatives with favorable luminescence properties are thus highly desirable. Group III-V nanostructures in general and InP-based nanostructures in particular, offer the best known substitute for cadmium-based materials due to their compatible emission range.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures is limited by the trace metal concentration in the precursor materials. The trace metal (including cadmium) concentration in the precursor materials for the Cd-free nanostructures, can be measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the core is a Group III-V nanostructure. In some embodiments, the core is a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core is a InP nanocrystal.

The synthesis of Group III-V nanostructures has been described in U.S. Pat. Nos. 5,505,928, 6,306,736, 6,576,291, 6,788,453, 6,821,337, 7,138,098, 7,557,028, 7,645,397, 8,062,967, and 8,282,412 and in U.S. Patent Appl. Publication No. 2015/0236195. Synthesis of Group III-V nanostructures has also been described in Wells, R. L., et al., "The use of tris(trimethylsilyl)arsine to prepare gallium arsenide and indium arsenide," *Chem. Mater.* 1:4-6 (1989) and in Guzelian, A. A., et al., "Colloidal chemical synthesis and characterization of InAs nanocrystal quantum dots," *Appl. Phys. Lett.* 69: 1432-1434 (1996).

Synthesis of InP-based nanostructures has been described, e.g., in Xie, R., et al., "Colloidal InP nanocrystals as efficient emitters covering blue to near-infrared," *J Am. Chem. Soc.* 129:15432-15433 (2007); Micic, O. I., et al., "Core-shell quantum dots of lattice-matched $ZnCdSe_2$ shells on InP cores: Experiment and theory," *J. Phys. Chem. B* 104:12149-12156 (2000); Liu, Z., et al., "Coreduction colloidal synthesis of III-V nanocrystals: The case of InP," *Angew. Chem. Int. Ed. Engl.* 47:3540-3542 (2008); Li, L. et al., "Economic synthesis of high quality InP nanocrystals using calcium phosphide as the phosphorus precursor," *Chem. Mater.* 20:2621-2623 (2008); D. Battaglia and X. Peng, "Formation of high quality InP and InAs nanocrystals in a noncoordinating solvent," *Nano Letters* 2:1027-1030 (2002); Kim, S., et al., "Highly luminescent InP/GaP/ZnS nanocrystals and their application to white light-emitting diodes," *J. Am. Chem. Soc.* 134:3804-3809 (2012); Nann, T., et al., "Water splitting by visible light: A nanophotocathode for hydrogen production," *Angew. Chem. Int. Ed.* 49:1574-1577 (2010); Borchert, H., et al., "Investigation of ZnS passivated InP nanocrystals by XPS," *Nano Letters* 2:151-154 (2002); L. Li and P. Reiss, "One-pot synthesis of highly luminescent InP/ZnS nanocrystals without precursor injection," *J. Am. Chem. Soc.* 130:11588-11589 (2008); Hussain, S., et al. "One-pot fabrication of high-quality InP/ZnS (core/shell) quantum dots and their application to cellular imaging," *Chemphyschem.* 10:1466-1470 (2009); Xu, S., et al., "Rapid synthesis of high-quality InP nanocrystals," *J. Am. Chem. Soc.* 128:1054-1055 (2006); Micic, O. I., et al., "Size-dependent spectroscopy of InP quantum dots," *J. Phys. Chem. B* 101:4904-4912 (1997); Haubold, S., et al., "Strongly luminescent InP/ZnS core-shell nanoparticles," *Chemphyschem.* 5:331-334 (2001); CrosGagneux, A., et al., "Surface chemistry of InP quantum dots: A comprehensive study," *J. Am. Chem. Soc.* 132:18147-18157 (2010); Micic, O. I., et al., "Synthesis and characterization of InP, GaP, and GaInP$_2$ quantum dots," *J. Phys. Chem.* 99:7754-7759 (1995); Guzelian, A. A., et al., "Synthesis of size-selected, surface-passivated InP nanocrystals," *J. Phys. Chem.* 100: 7212-7219 (1996); Lucey, D. W., et al., "Monodispersed InP quantum dots prepared by colloidal chemistry in a non-coordinating solvent," *Chem. Mater.* 17:3754-3762 (2005); Lim, J., et al., "InP@ZnSeS, core@composition gradient shell quantum dots with enhanced stability," *Chem. Mater.* 23:4459-4463 (2011); and Zan, F., et al., "Experimental studies on blinking behavior of single InP/ZnS quantum dots: Effects of synthetic conditions and UV irradiation," *J. Phys. Chem. C* 116:394-3950 (2012).

In some embodiments, the core is doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, CuInS$_2$, CuInSe$_2$, AlN, AlP, AlAs, GaN, GaP, or GaAs.

Inorganic shell coatings on nanostructures are a universal approach to tailoring their electronic structure. Additionally, deposition of an inorganic shell can produce more robust particles by passivation of surface defects. Ziegler, J., et al., *Adv. Mater.* 20:4068-4073 (2008). For example, shells of wider band gap semiconductor materials such as ZnS can be deposited on a core with a narrower band gap—such as CdSe or InP—to afford structures in which excitons are confined within the core. This approach increases the probability of radiative recombination and makes it possible to synthesize very efficient quantum dots with quantum yields close to unity and thin shell coatings.

In some embodiments, the nanostructures include a core and at least one shell. In some embodiments, the nanostructures include a core and at least two shells. The shell can, e.g., increase the quantum yield and/or stability of the nanostructures. In some embodiments, the core and the shell comprise different materials. In some embodiments, the nanostructure comprises shells of different shell material.

Exemplary materials for preparing shells include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, Si$_3$N$_4$, Ge$_3$N$_4$, Al$_2$O$_3$, Al$_2$CO, and combinations thereof.

In some embodiments, the shell is a mixture of at least two of a zinc source, a selenium source, a sulfur source, a tellurium source, and a cadmium source. In some embodiments, the shell is a mixture of two of a zinc source, a selenium source, a sulfur source, a tellurium source, and a cadmium source. In some embodiments, the shell is a mixture of three of a zinc source, a selenium source, a sulfur source, a tellurium source, and a cadmium source. In some embodiments, the shell is a mixture of: zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium and zinc; cadmium, zinc, and sulfur; cadmium, zinc, and selenium; or cadmium, zinc, sulfur, and selenium.

Exemplary core/shell luminescent nanocrystals include, but are not limited to (represented as core/shell) CdSe/ZnS, InP/ZnS, PbSe/PbS, CdSe/CdS, CdTe/CdS, and CdTe/ZnS. The synthesis of core/shell nanostructures is disclosed in U.S. Pat. No. 9,169,435.

The luminescent nanocrystals can be made from a material impervious to oxygen, thereby simplifying oxygen barrier requirements and photostabilization of the quantum dots in the quantum dot film layer. In exemplary embodiments, the luminescent nanocrystals are coated with one or more organic polymeric ligand material and dispersed in an organic polymeric matrix comprising one or more matrix materials. The luminescent nanocrystals can be further coated with one or more inorganic layers comprising one or more material such as a silicon oxide, an aluminum oxide, or a titanium oxide (e.g., SiO$_2$, Si$_2$O$_3$, TiO$_2$, or Al$_2$O$_3$), to hermetically seal the quantum dots.

In some embodiments, the nanostructures comprise ligands conjugated to, cooperated with, associated with, or attached to their surface. In some embodiments, the nanostructures include a coating layer comprising ligands to protect the nanostructures from external moisture and oxidation, to control aggregation, and to allow for dispersion of the nanostructures in the matrix material. Suitable ligands include those disclosed in U.S. Pat. Nos. 6,949,206; 7,267,875; 7,374,807; 7,572,393; 7,645,397; and 8,563,133 and in U.S. Patent Appl. Publication Nos. 2008/0237540; 2008/0281010; and 2010/0110728.

In some embodiments, the nanostructure comprises a multi-part ligand structure, such as the three-part ligand structure disclosed in U.S. Patent Appl. Publication No. 2008/237540, in which the head-group, tail-group, and middle/body group are independently fabricated and optimized for their particular function, and then combined into an ideally functioning complete surface ligand.

In some embodiments, the ligands comprise one or more organic polymeric ligands. Suitable ligands provide: efficient and strong bonding quantum dot encapsulation with low oxygen permeability; precipitate or segregate into domain in the matrix material to form a discontinuous dual-phase or multi-phase matrix; disperse favorably throughout the matrix material; and are commercially available materials or can be easily formulated from commercially available materials.

In some embodiments, the ligand is a polymer, a glassy polymer, a silicone, a carboxylic acid, a dicarboxylic acid, a polycarboxylic acid, an acrylic acid, a phosphonic acid, a phosphonate, a phosphine, a phosphine oxide, a sulfur, or an amine.

In some embodiments, the population of nanostructures emits red, green, or blue light. In some embodiments, the respective portions of red, green, and blue light can be controlled to achieve a desired white point for the white light emitted by a display device incorporating a nanostructure film.

In some embodiments, the nanostructure composition comprises at least one population of nanostructure materials. In some embodiments, the nanostructure composition comprises a population of between 1 and 5, 1 and 4, 1 and 3, 1 and 2, 2 and 5, 2 and 4, 2 and 3, 3 and 5, 3 and 4, or 4 and 5 nanostructure materials. Any suitable ratio of the populations of quantum dots can be combined to create the desired nanostructure composition characteristics. In some embodiments, the nanostructure is a quantum dot.

In some embodiments, the weight percentage of the population of nanostructures in the nanostructure composition is between about 0.001% and about 2%, about 0.001% and about 1%, about 0.001% and about 0.5%, about 0.001% and about 0.1%, about 0.001% and 0.01%, about 0.01% and about 2%, about 0.01% and about 1%, about 0.01% and about 0.5%, about 0.01% and about 0.1%, about 0.1% and about 2%, about 0.1% and about 1%, about 0.1% and about 0.5%, about 0.5% and about 2%, about 0.5% and about 1%, or about 1% and about 2%. In some embodiments, the nanostructure is a quantum dot.

In some embodiments, the weight percent of the population of nanostructures in the nanostructure molded article is between about 0.001% and about 2%, about 0.001% and about 1%, about 0.001% and about 0.5%, about 0.001% and about 0.1%, about 0.001% and about 0.01%, about 0.01% and about 2%, about 0.01% and about 1%, about 0.01% and about 0.5%, about 0.01% and about 0.1%, about 0.1% and about 2%, about 0.1% and about 1%, about 0.1% and about 0.5%, about 0.5% and about 2%, about 0.5% and about 1%, or about 1% and about 2%. In some embodiments, the nanostructure is a quantum dot.

Aminosilicone Polymer

In some embodiments, the nanostructures are dispersed in an aminosilicone polymer.

In some embodiments, the aminosilicone polymer has at least one diamino functional group (e.g., an aminoethylaminopropyl group). In some embodiments, an aminosilicone polymer will have a siloxane backbone. A siloxane backbone is characterized by —Si—O—Si— and is represented by the general formula —Si($R^A_2$)O—, where the $R^A$ groups can be the same or different, and can be any suitable group, including, but not limited to, hydrogen, alkyl, heteroalkyl, alkylamine, carboxyalkyl, alkenyl, alkynyl, cycloalkyl, heterocycloalkyl, aryl, and heteroaryl. The siloxane backbone can be linear, branched, or cyclic. The siloxane backbone can include a single type of monomer repeat unit, forming a homopolymer. Alternatively, the siloxane backbone can include two or more types of monomer repeat units to form a copolymer that can be a random copolymer or a block copolymer.

In some embodiments, the aminosilicone polymer is formed from the polymerization of (i) monomers of the form —O—Si—($R^B$)$_2$—O—, where $R^B$ is independently selected at each occurrence from lower alkyl groups, such as a methyl group at each occurrence, and (ii) monomers of the form OSi($R^C$)($R^D$)O, where $R^C$ is a lower alkyl group, such as a methyl, ethyl, or propyl, and $R^D$ is a diamine-substituted alkyl group of the form —(CH$_2$)$_{1-6}$—NR$^N$—(CH$_2$)$_{1-6}$—NR$^N_2$, —(CH$_2$)$_{2-4}$—NR$^N$—(CH$_2$)$_{2-4}$—NR$^N_2$, or —(CH$_2$)$_3$—NR$^N$—(CH$_2$)$_2$—NR$^N_2$, where $R^N$ is independently selected at each occurrence from hydrogen or lower alkyl, such as a methyl, ethyl, or propyl. In some embodiments, the $R^D$ is a group —(CH$_2$)$_{1-6}$—NH—(CH$_2$)$_{1-6}$—NH$_2$, —(CH$_2$)$_{2-4}$—NH—(CH$_2$)$_{1-3}$—NH$_2$, or —(CH$_2$)$_3$—NH—(CH$_2$)$_2$—NH$_2$. The aminosilicone may have a linear or branched chemical structure.

In some embodiments, the aminosilicone polymer contains ligands suitable for binding to quantum dots. Suitable ligands include, but are not limited to, amine, carboxy, and thiol groups, capable of binding to the quantum dot via hydrogen-bonding, hydrophobic interactions, or van der Waal's forces. In some embodiments, the aminosilicone polymer includes amine binding groups as the ligands. In some embodiments, the aminosilicone polymer includes amine and carboxy binding groups as the ligands.

In some embodiments, when the nanostructures are dispersed in the aminosilicone polymer, ligands on the aminosilicone polymer bind to the nanostructures.

In some embodiments, the FGEW of the aminosilicone is between about 1,000 g/mol and about 2,000 g/mol, about 1,000 g/mol and about 1,600 g/mol, about 1,000 g/mol and about 1,400 g/mol, about 1,400 g/mol and about 2,000 g/mol, between about 1,400 g/mol and about 1,600 g/mol, or about 1,600 g/mol and about 2,000 g/mol. In some embodiments, the FGEW of the aminosilicone polymer has an FGEW of 1,200, 1,250, 1,300, 1,400, 1,500, 1,600, 1,700, or 1,800 g/mol. In some embodiments, the FGEW of the aminosilicone polymer is between about 1,250 and about 1,800 g/mol.

In some embodiments, the aminosilicone polymer is a commercially available aminosilicone polymer.

In some embodiments, the aminosilicone polymer is SF1708 (Momentive Performance Materials Inc., Waterford, NY). SF1708 is an aminopropylaminoethylpolysiloxane which has a FGEW of 1,250 g/mol, a molecular weight from 25,000 to 30,000 Daltons, and a viscosity of 1250-2500 centipoise at 25° C.

In some embodiments, the aminosilicone polymer is KF-393, KF-859, KF-860, KF-861, KF-867, KF-869, KF-880, KF-8002, KF-8004, KF-8005, or KF-8021 (Shin-Etsu Chemical Co., Ltd, Tokyo, Japan). KF-393 has a FGEW of 350 g/mol, a viscosity of 70 mm$^2$/s, a specific gravity of 0.98, and a refractive index of 1.422, all at 25° C. KF-859 has a FGEW of 6,000 g/mol, a viscosity of 60 mm$^2$/s, a specific gravity of 0.96, and a refractive index of 1.403, all at 25° C. KF-860 has a FGEW of 7,600 g/mol, a viscosity of 250 mm$^2$/s, a specific gravity of 0.97, and a refractive index of 1.404, all at 25° C. KF-861 has a FGEW of 2,000 g/mol, a viscosity of 3,500 mm$^2$/s, a specific gravity of 0.98, and a refractive index of 1.408, all at 25° C. KF-867 has a FGEW of 1,700 g/mol, a viscosity of 1,300 mm$^2$/s, a specific gravity of 0.98, and a refractive index of 1.407, all at 25° C. KF-869 has a FGEW of 3,800 g/mol, a viscosity of 1,500 mm$^2$/s, a specific gravity of 0.97, and a refractive index of 1.405, all at 25° C. KF-880 has a FGEW of 1,800 g/mol, a viscosity of 650 mm$^2$/s, a specific gravity of 0.98, and a refractive index of 1.407, all at 25° C. KF-8002 has a FGEW of 1,700 g/mol, a viscosity of 1,100 mm$^2$/s, a specific gravity of 0.98, and a refractive index of 1.408, all at 25° C. KF-8004 has a FGEW of 1,500 g/mol, a viscosity of 800 mm$^2$/s, a specific gravity of 0.98, and a refractive index of 1.408, all at 25° C. KF-8005 has a FGEW of 11,000 g/mol, a viscosity of 1,200 mm$^2$/s, a specific gravity of 0.97, and a refractive index of 1.403, all at 25° C. KF-8021 has a FGEW of 55,000 g/mol, a viscosity of 15,000 mm$^2$/s, a specific gravity of 0.97, and a refractive index of 1.403, all at 25° C.

In some embodiments, the aminosilicone polymer is OFX-8417, BY 16-849, FZ-3785, BY 16-872, or BY 16-853 U (Dow Corning Toray Co., Ltd., Japan). OFX-8417 has a FGEW of 1,700 g/ml and a viscosity of 1,200 m$^2$/s, all at 25° C. BY 16-849 has a FGEW of 600 g/ml and a viscosity of 1,200 m$^2$/s, all at 25° C. FZ-3785 has a FGEW of 6,000 g/ml and a viscosity of 3,500 m$^2$/s, all at 25° C. BY 16-872 has a FGEW of 1,800 g/ml and a viscosity of 18,100 m$^2$/s, all at 25° C. BY 16-853 has a FGEW of 450 g/ml and a viscosity of 14 m$^2$/s, all at 25° C.

In some embodiments, the aminosilicone polymer is an amine-terminated aminosilicone such as DMS-A11, DMS-A12, DMS-A15, DMS-A21, DMS-A31, DMS-A32, DMS-A35, DMS-A211, or DMS-A214 (Gelest, Inc., Morrisville, PA). In some embodiments, the aminosilicone polymer has a pendant amine functionality such as AMS-132, AMS-152, AMS-162, AMS-233, AMS-242, ATM-1112, ATM-1322, UBS-0541, or UBS-0822 (Gelest, Inc., Morrisville, PA).

In some embodiments, the aminosilocone polymer is an amine-terminated aminosilicone such as GP-657, GP-RA-157, GP-34, GP-397, GP-145, GP-871, or GP-846 (Genesee Polymers, Flint, Mich.). In some embodiments, the aminosilicone polymer has a pendant amine functionality such as GP-4, GP-6, GP-581, GP-344, GP-342, GP-316, or GP-345 (Genesee Polymers, Flint, Mich.).

In some embodiments, the aminosilicone polymer can be prepared using methods known to one of skill in the art. In some embodiments, the aminosilicone polymer is prepared using the methods disclosed in U.S. Pat. No. 9,139,770, incorporated herein by reference in its entirety.

In some embodiments, the aminosilicone polymer has a waxy component and an amine binding component. The waxy component can be any solubilizing or hydrophobic group. In some embodiments, the solubilizing or hydrophobic group can be a long-chain alkyl group, a long-chain alkenyl group, a long-chain alkynyl group, a cycloalkyl, or an aryl. In some embodiments, the solubilizing or hydrophobic group can be a $C_{8-20}$ alkyl, a $C_{8-20}$ alkenyl, a $C_{8-20}$ alkynyl, a $C_{3-12}$ cycloalkyl, or a $C_{6-16}$ aryl.

In some embodiments, the solubilizing group or waxy component can be a long-chain alkyl. In some embodiments, each long-chain alkyl group can be octyl, nonyl, decyl, undecyl, dodecyl, tridecyl, tetradecyl, pentadecyl, hexadecyl, heptadecyl, octadecyl, nonadecyl, or icosyl. In some embodiments, each long-chain alkyl group can be hexadecyl, heptadecyl, octadecyl, nonadecyl, or icosyl. In some embodiments, each long-chain alkyl group can be hexadecyl, octadecyl, or icosyl. In some embodiments, each long-chain alkyl group can be octadecyl. The long-chain alkyl group can be linear or branched, and optionally substituted.

In some embodiments, the aminosilicone polymer contains a plurality of monomer repeat units. In some embodiments, the aminosilicone polymer contains a plurality of amine binding groups each covalently attached to one of the monomer repeat units, thereby forming a first population of monomer repeat units. In some embodiments, the aminosilicone polymer also includes a plurality of solubilizing groups each covalently attached to one of the monomer repeat units, thereby forming a second population of monomer repeat units.

In some embodiments, the aminosilicone polymer includes a plurality of alkylamine binding groups each covalently attached to one of the monomer repeat units, thereby forming a first population of monomer repeat units. In some embodiments, the aminosilicone polymer also includes a plurality of solubilizing or hydrophobic groups each covalently attached to one of the monomer repeat units, thereby forming a second population of monomer repeat units.

The aminosilicone polymer can have any suitable number of monomer repeat units. In some embodiments, the aminosilicone polymer can include between about 5 and about 100, about 5 and about 50, about 5 and about 40, about 5 and about 30, about 5 and about 20, about 5 and about 10, about 10 and about 100, about 10 and about 50, about 10 and about 40, about 10 and about 30, about 10 and about 20, about 20 and about 100, about 20 and about 50, about 20 and about 40, about 20 and about 30, about 30 and about 100, about 30 and about 50, about 30 and about 40, about 40 and about 100, about 40 and about 50, or about 50 and about 100 monomer repeat units. In some embodiments, the amino-silicone polymer can include about 5, 10, 15, 20, 25, 30, 40, 50, 60, 70, 80, 90 or 100 monomer repeat units.

When there are at least two types of monomer repeat units, one type of monomer repeat can be present in a greater amount relative to the other types of monomer repeat units. Alternatively, the different types of monomer repeat units can be present in about the same amount. In some embodiments, the first population of monomer repeat units is about the same number as the second population of monomer repeat units.

Each monomer repeat unit can be the same or different. In some embodiments, there are at least two types of monomer repeat units in the aminosilicone polymer. In some embodiments, the aminosilicone polymer includes at least two types of monomer repeat units where a first type includes a long-chain alkyl group and a second type includes an alkylamine binding group. Other types of monomer repeat units can also be present. The aminosilicone polymer can include 1, 2, 3, 4, or more different kinds of monomer repeat units. In some embodiments, the aminosilicone polymers have a single type of monomer repeat unit. In some embodiments, the aminosilicone polymers have two different types of monomer repeat units.

In some embodiments, each monomer repeat unit is covalently linked to both the amine binding group and the long-chain alkyl group, such that the first and second populations of monomer repeat units are the same.

In some embodiments, each monomer repeat unit is covalently linked to both the alkylamine binding group and the long-chain alkyl group, such that the first and second populations of monomer repeat units are the same.

In some embodiments, the aminosilicone polymer has the structure of formula I.

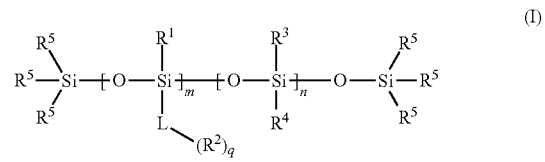

(I)

wherein each $R^1$ can independently be $C_{1-20}$ alkyl, $C_{1-20}$ heteroalkyl, $C_{2-20}$ alkenyl, $C_{2-20}$ alkynyl, cycloalkyl, or aryl, each optionally substituted with one or more —Si$(R^{1a})_3$ groups; each $R^{1a}$ can independently be $C_{1-6}$ alkyl, cycloalkyl, or aryl; each L can independently be $C_{3-8}$ alkylene, $C_{3-8}$ heteroalkylene, $C_{3-8}$ alkylene-O—$C_{2-8}$ alkylene, $C_{3-8}$ alkylene-(C(O)NH—$C_{2-8}$ alkylene)$_q$, $C_{3-8}$ heteroalkylene-(C(O)NH—$C_{2-8}$ alkylene)$_q$, or $C_{3-8}$ alkylene-O—$C_{3-8}$ alkylene-(C(O)NH—$C_{2-8}$ alkylene)$_q$; each $R^2$ can independently be $NR^{2a}R^{2b}$ or C(O)OH, wherein at least one $R^2$ is $NR^{2a}R^{2b}$; each of $R^{2a}$ and $R^{2b}$ can independently be H or $C_{1-6}$ alkyl; each $R^3$ can independently be $C_{1-20}$ alkyl, $C_{2-20}$ alkenyl, $C_{2-20}$ alkynyl, cycloalkyl, or aryl; each $R^4$ can independently be $C_{8-20}$ alkyl, $C_{8-20}$ heteroalkyl, cycloalkyl, or aryl, each optionally substituted with one or more —Si$(R^{1a})_3$ groups; each $R^5$ can independently be $C_{1-20}$ alkyl, $C_{2-20}$ alkenyl, $C_{2-20}$ alkynyl, -L-$(R^2)_q$, cycloalkyl, or aryl; subscript m is an integer from 5 to 50; subscript n is an integer from 0 to 50; and subscript q is an integer from 1 to 10, wherein when subscript n is 0, then $R^1$ can be $C_{8-20}$ alkyl, $C_{8-20}$ heteroalkyl, $C_{8-20}$ alkenyl, $C_{8-20}$ alkynyl, cycloalkyl, or aryl, each optionally substituted with one or more —Si$(R^{1a})_3$ groups.

In some embodiments, wherein each $R^1$ can independently be $C_{1-20}$ alkyl, $C_{1-20}$ heteroalkyl, $C_{2-20}$ alkenyl, $C_{2-20}$ alkynyl, cycloalkyl, or aryl; each $R^{1a}$ can independently be $C_{1-6}$ alkyl, cycloalkyl, or aryl; each L can independently be $C_{3-8}$ alkylene; each $R^2$ can independently be $NR^{2a}R^{2b}$ or $C(O)OH$, wherein at least one $R^2$ is $NR^{2a}R^{2b}$; each of $R^{2a}$ and $R^{2b}$ can independently be H or $C_{1-6}$ alkyl; each $R^3$ can independently be $C_{1-20}$ alkyl, $C_{2-20}$ alkenyl, $C_{2-20}$ alkynyl, cycloalkyl, or aryl; each $R^4$ can independently be $C_{8-20}$ alkyl, $C_{8-20}$ heteroalkyl, cycloalkyl, or aryl; each $R^5$ can independently be $C_{1-20}$ alkyl, $C_{2-20}$ alkenyl, $C_{2-20}$ alkynyl, -L-$(R^2)_q$, cycloalkyl, or aryl; subscript m is an integer from 5 to 50; subscript n is an integer from 0 to 50; and subscript q is an integer from 1 to 10, wherein when subscript n is 0, then $R^1$ can be $C_{8-20}$ alkyl, $C_{8-20}$ heteroalkyl, $C_{8-20}$ alkenyl, $C_{8-20}$ alkynyl, cycloalkyl, or aryl.

Radical L can be any suitable linker to link the binding group $R^2$ to the siloxane polymer. In some embodiments, each L can independently be $C_{3-8}$ alkylene, $C_{3-8}$ alkylene-O—$C_{2-8}$ alkylene, $C_{3-8}$ alkylene-(C(O)NH—$C_{2-8}$ alkylene)$_2$, or $C_{3-8}$ alkylene-O—$C_{1-8}$ alkylene-(C(O)NH—$C_{2-8}$ alkylene)$_3$. In other embodiments, each L can independently be $C_{3-8}$ alkylene. In some other embodiments, each L can independently be propylene, butylene, pentylene, n-propylene-O-i-propylene, or pentylene-(C(O)NH-ethylene)$_2$. In still other embodiments, each L can independent be propylene, butylene, or pentylene.

The binding group, $R^2$, can be any suitable amine or carboxylic acid. For example, $R^2$ can be a primary amine where both of $R^{2a}$ and $R^{2b}$ are H. Alternatively, $R^2$ can be a secondary amine where one of $R^{2a}$ and $R^{2b}$ is H and the other is $C_{1-6}$ alkyl. Representative secondary amines include, but are not limited to, those where $R^{2a}$ is methyl, ethyl, propyl, isopropyl, butyl, or pentyl. Tertiary amines, where each of $R^{2a}$ and $R^{2b}$ is $C_{1-6}$ alkyl, are also useful as the binding group $R^2$. In embodiments where each of $R^{2a}$ and $R^{2b}$ is $C_{1-6}$ alkyl, the $R^{2a}$ and $R^{2b}$ can be the same or different. In some embodiments, the tertiary amine is a —$N(CH_3)_2$, —$N(CH_2CH_3)_2$, —$N(CH_2CH_2CH_3)_2$, —$N(CH_3)(CH_2CH_3)$, —$N(CH_3)(CH_2CH_2CH_3)$, or —$N(CH_2CH_3)(CH_2CH_2CH_3)$.

In some embodiments, each -L-$(R^2)_q$ group can independently be $C_{3-8}$ alkylene-$(R^2)_{1-3}$, $C_{3-8}$ heteroalkylene-$R^2$, or $C_{3-8}$ alkylene-(C(O)NH—$C_{2-8}$ alkylene-$R^2)_2$. In some embodiments, each L-$(R^2)_q$ group can independently be $C_{3-8}$ alkylene-C(O)OH, $C_{3-8}$ alkylene-(C(O)OH)$_2$, $C_{3-8}$ alkylene-O $C_{2-8}$ alkylene-(C(O)OH)$_3$, $C_{3-8}$ alkylene-$NR^{2a}R^{2b}$, or $C_{3-8}$ alkylene-(C(O)NH—$C_{2-8}$ alkylene-$NR^{2a}R^{2b})_2$. In some embodiments, each L-$(R^2)_q$ group can independently be $C_{3-8}$ alkylene-C(O)OH, $C_{3-8}$ alkylene-(C(O)OH)$_2$, or $C_{3-8}$ alkylene-$NR^{2a}R^{2b}$. In some embodiments, each L-$(R^2)_q$ group can independently be:

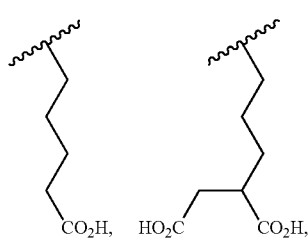

-continued

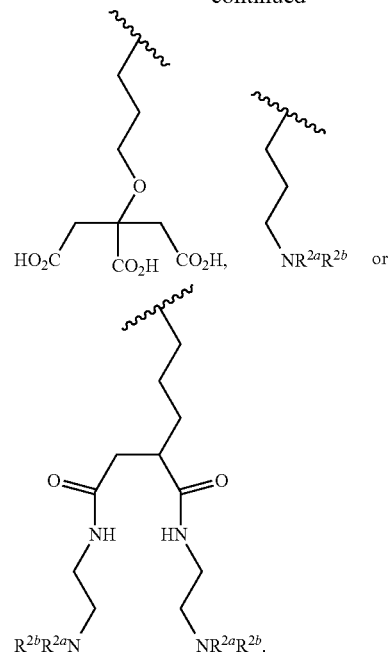

In some embodiments, each L-$(R^2)_q$ group can independently be:

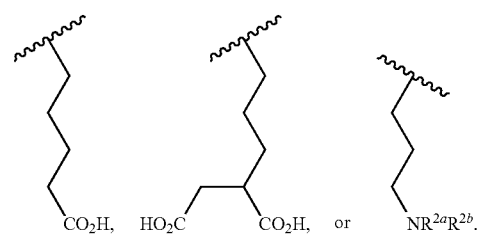

One of radicals $R^1$ and $R^4$ can be the solubilizing ligand. When subscript n is 0, $R^1$ can be the solubilizing ligand. When subscript n is greater than 1, either of $R^1$ and $R^4$ can be the solubilizing ligand. Any suitable solubilizing ligand can be used in the present invention. In some embodiments, at least one of $R^1$ and $R^4$ can be $C_{8-20}$ alkyl or $C_{8-20}$ heteroalkyl, wherein each alkyl group is optionally substituted with one —$Si(R^{1a})_3$ group. In some embodiments, at least one of $R^1$ and $R^4$ can be $C_{8-20}$ alkyl or $C_{8-20}$ heteroalkyl. In some embodiments, at least one of $R^1$ and $R^4$ can be $C_{16}$ alkyl, $C_{18}$ alkyl, $C_{20}$ alkyl, or —$(CH_2)_2$—$(OCH_2CH_2)_3$—$OCH_3$, wherein each alkyl group is optionally substituted with one —$Si(R^{1a})_3$ group. In some embodiments, at least one of $R^1$ and $R^4$ can be $C_{16}$ alkyl, $C_{18}$ alkyl, $C_{20}$ alkyl, or —$(CH_2)_2$—$(OCH_2CH_2)_3$—$OCH_3$.

When the alkyl group of $R^1$ or $R^4$ is substituted with the —$Si(R^{1a})_3$ group, the substitution can be at any point on the alkyl group, including the terminal carbon, or any other carbon in the alkyl chain. The alkyl group can be branched or unbranched. The $R^{1a}$ group can be any suitable group that promotes solubilization of the siloxane polymer. For example, each $R^{1a}$ can independently be $C_{1-6}$ alkyl, cycloalkyl, or aryl. Each $R^{1a}$ can be the same or different. In some embodiments, each $R^{1a}$ can independently be $C_{1-6}$ alkyl. The alkyl groups of $R^{1a}$ can be branched or unbranched. In some embodiments, the alkyl groups of $R^{1a}$ are methyl, ethyl, or propyl. In some embodiments, each $R^{1a}$ can be ethyl.

Radical $R^3$ can be any suitable group. In some embodiments, each $R^3$ can independently be $C_{1-20}$ alkyl, $C_{2-20}$ alkenyl, $C_{2-20}$ alkynyl, cycloalkyl, or aryl. In some embodiments, each $R^3$ can independently be $C_{1-20}$ alkyl. In some embodiments, each $R^3$ can independently be $C_{1-6}$ alkyl. In some embodiments, each $R^3$ can independently be $C_{1-3}$ alkyl. In some embodiments, each $R^3$ can independently be methyl, ethyl, or propyl. In some embodiments, each $R^3$ can be methyl.

$R^5$ can be any suitable group. In some embodiments, each $R^5$ can independently be $C_{1-20}$ alkyl, $C_{2-20}$ alkenyl, $C_{2-20}$ alkynyl, -L-$(R^2)_q$, cycloalkyl, or aryl. In some embodiments, each $R^5$ can independently be $C_{1-20}$ alkyl. In some embodiments, each $R^5$ can independently be $C_{1-6}$ alkyl. In some embodiments, each $R^5$ can independently be $C_{1-3}$ alkyl. In some embodiments, each $R^5$ can independently be methyl, ethyl, or propyl. In some embodiments, each $R^5$ can be methyl.

Alternatively, $R^5$ can be an amine or carboxy binding group, or a solubilizing group. In some embodiments, at least one $R^5$ can be -L-$(R^2)_q$, as defined above. In some embodiments, at least one $R^5$ can be $C_{8-20}$ alkyl. In some embodiments, at least one $R^5$ can be $C_{12-20}$ alkyl. In some embodiments, at least one $R^5$ can be octadecyl.

When the aminosilicone polymers have two types of monomer repeat units, such that subscript n is not 0, the structure can be the structure of formula I, wherein each $R^5$ can independently be $C_{1-20}$ alkyl, $C_{2-20}$ alkenyl, $C_{2-20}$ alkynyl, cycloalkyl, or aryl; subscript m can be an integer from 5 to 50; and subscript n can be an integer from 1 to 50. In some embodiments, $R^1$ can independently be $C_{1-3}$ alkyl. In some embodiments, the alkyl groups of $R^4$ can be $C_{8-20}$ alkyl, $C_{12-20}$ alkyl, $C_{14-20}$ alkyl, $C_{16-20}$ alkyl, or $C_{18-20}$ alkyl.

In some embodiments, each $R^5$ can independently be $C_{1-20}$ alkyl, $C_{2-20}$ alkenyl, $C_{2-20}$ alkynyl, cycloalkyl, or aryl; subscript m can be an integer from 5 to 50; and subscript n can be 0. In some embodiments, each $R^1$ can independently be $C_{8-20}$ alkyl or $C_{8-20}$ heteroalkyl, wherein the alkyl group can optionally be substituted with one —$Si(R^{1a})_3$ group; each $R^{1a}$ can independently be $C_{1-6}$ alkyl; each $R^5$ can independently be $C_{1-3}$ alkyl; and subscript q can be an integer from 1 to 3. In still other embodiments, each $R^1$ can independently be $C_{8-20}$ alkyl or $C_{8-20}$ heteroalkyl; each $R^{1a}$ can independently be $C_{1-6}$ alkyl; each $R^5$ can independently be $C_{1-3}$ alkyl; and subscript q can be an integer from 1 to 3.

Any suitable number of subscripts m and n can be present in the aminosilicone polymers. For example, the number of subscripts m and n can be between about 1 and about 100, about 1 and about 80, about 1 and about 60, about 1 and about 40, about 1 and about 20, about 1 and about 10, about 5 and about 100, about 5 and about 80, about 5 and about 60, about 5 and about 40, about 5 and about 40, about 5 and about 20, about 5 and about 10, about 10 and about 100, about 10 and about 80, about 10 and about 60, about 10 and about 40, about 10 and about 20, about 20 and about 100, about 20 and about 80, about 20 and about 60, about 20 and about 40, about 40 and about 100, about 40 and about 80, about 40 and about 60, about 60 and about 100, about 60 and about 80, or about 80 and about 100. Alternatively, the number of subscripts m and n can be about 5, 10, 15, 20, 25, 30, 40, 50, 60, 70, 80, 90, or 100.

Any suitable ratio of subscripts m and n can be present in the quantum dot binding-ligands. When m and n are both greater than 0, the ratio of subscript m to n can be about 100:1, 90:1, 80:1, 75:1, 70:1, 60:1, 50:1, 40:1, 30:1, 25:1, 20:1, 15:1 10:1, 5:1, 4:1, 3:1, 2.5:1 2:1, 1:1, 1:2, 1:2.5, 1:3, 1:4, 1:5, 1:10, 1:15, 1:20, 1:25, 1:30, 1:40, 1:50, 1:60, 1:70, 1:75, 1:80, 1:90 or 1:100. In some embodiments, the ratio of subscript m to subscript n is between about 1:100 and about 1:1. In some embodiments, the ratio of subscript m to subscript n is between about 1:100 and about 1:10. In some embodiments, the ratio of subscript m to subscript n is between about 1:50 and about 1:10. In some embodiments, the ratio of subscript m to subscript n is about 1:20.

In some embodiments, $R^1$ and $R^3$ can each independently be $C_{1-3}$ alkyl; each $R^{1a}$ can independently be $C_{1-6}$ alkyl; each $R^4$ can independently be $C_{8-20}$ alkyl or $C_{8-20}$ heteroalkyl, wherein the alkyl group can optionally be substituted with one —$Si(R^{1a})_3$ group; each $R^5$ can independently be $C_{1-3}$ alkyl; and subscript q can be an integer from 1 to 3.

In some embodiments, wherein $R^1$, $R^3$, and $R^5$ are methyl and subscript n is other than 0, the aminosilicone polymer of formula I has the structure of formula Ia:

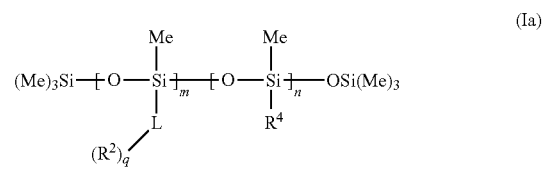

(Ia)

wherein subscript m is an integer from 5 to 14, subscript n is an integer from 1 to 14, $R^2$ is $NR^{2a}R^{2b}$ and L, q, $R^{2a}$, $R^{2b}$, and $R^4$ are as defined for formula I.

In some embodiments, the aminosilicone polymer of formula Ia has one of the following structures:

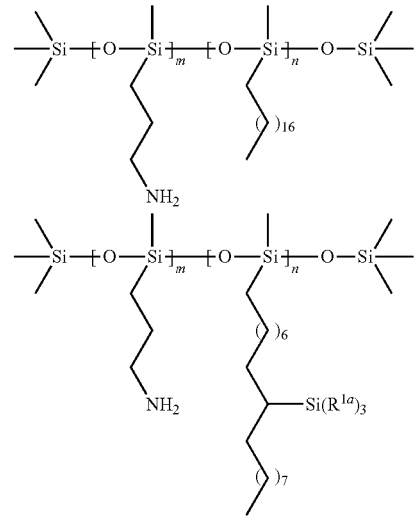

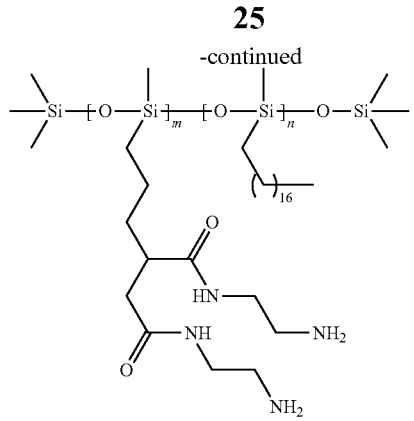

wherein subscript m is an integer from 10 to 14, subscript n is an integer from 1 to 14, and $R^{1a}$ is as defined for formula I.

In some embodiments, the aminosilicone polymer of formula Ia has the following structure:

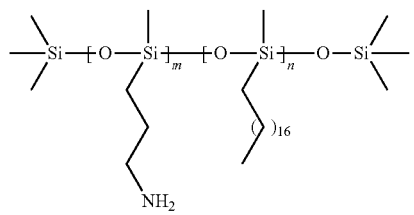

wherein subscript m is an integer from 10 to 14 and subscript n is an integer from 1 to 14.

In some embodiments, where $R^5$ is methyl and subscript n is 0, the aminosilicone polymer of formula I has the structure of formula Ib:

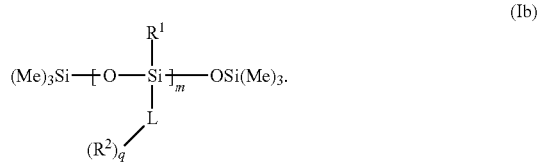

wherein $R^2$ is $NR^{2a}R^{2b}$, and L, m, q, $R^1$, $R^{2a}$, and $R^{2b}$ are as defined for formula I.

In some embodiments, $R^1$ can be $C_{8-20}$ alkyl. In some embodiments, the aminosilicone polymer of formula Ib has the following structure:

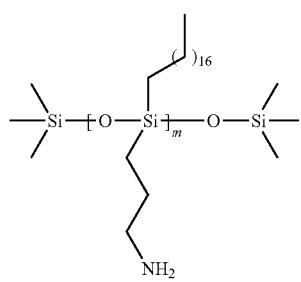

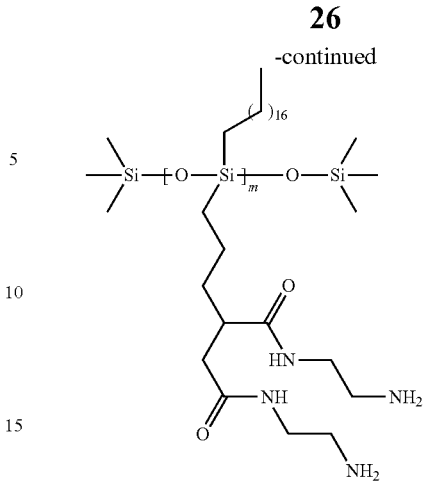

wherein subscript m is an integer from 5 to 50.

In some embodiments, where $L\text{-}(R^2)_q$ is $C_{3-8}$ alkylene-$NR^{2a}R^{2b}$ the aminosilicone polymer of formula I has the structure of formula Ic:

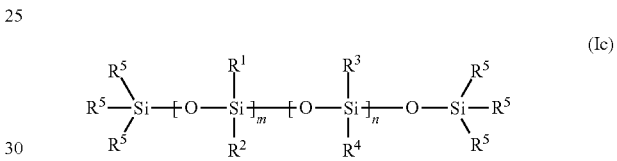

wherein each $R^1$ can independently be $C_{1-20}$ alkyl, $C_{2-20}$ alkenyl, $C_{2-20}$ alkynyl, cycloalkyl, or aryl, wherein the alkyl group is optionally substituted with one $-\text{Si}(R^{1a})_3$ group; each $R^2$ can independently be $C_{3-8}$ alkylene-$NR^{2a}R^{2b}$; each of $R^{2a}$ and $R^{2b}$ can independently be H or $C_{1-6}$ alkyl; each $R^3$ can independently be $C_{1-20}$ alkyl, $C_{2-20}$ alkenyl, $C_{2-20}$ alkynyl, cycloalkyl, or aryl; each $R^4$ can independently be $C_{8-20}$ alkyl; each $R^5$ can independently be $C_{1-20}$ alkyl, $C_{2-20}$ alkenyl, $C_{2-20}$ alkynyl, $C_{3-8}$ alkylene-$NR^{2a}R^{2b}$, cycloalkyl, or aryl; subscript m can be an integer from 5 to 50; and subscript n can be an integer from 0 to 50; wherein when subscript n is 0, then $R^1$ can be $C_{8-20}$ alkyl, $C_{8-20}$ alkenyl, $C_{8-20}$ alkynyl, cycloalkyl, or aryl. In some embodiments, the alkyl groups of $R^1$ or $R^4$ can be $C_{8-20}$ alkyl, $C_{12-20}$ alkyl, $C_{14-20}$ alkyl, $C_{16-20}$ alkyl, or $C_{18-20}$ alkyl.

Radical $R^5$ can be any suitable group. In some embodiments, each $R^5$ can independently be $C_{1-20}$ alkyl, $C_{2-20}$ alkenyl, $C_{2-20}$ alkynyl, $C_{3-8}$ alkylene-$NR^{2a}R^{2b}$, cycloalkyl, or aryl. In some embodiments, each $R^5$ can independently be $C_{1-20}$ alkyl, $C_{2-20}$ alkenyl, $C_{2-20}$ alkynyl, cycloalkyl, or aryl. In some embodiments, each $R^5$ can be $C_{1-20}$ alkyl. In some embodiments, each $R^5$ can be $C_{8-20}$ alkyl. In some embodiments, each $R^5$ can be octadecyl. In some embodiments, each $R^5$ can be $C_{1-3}$ alkyl. In some embodiments, each $R^5$ can independently be methyl, ethyl, or propyl. In some embodiments, each $R^5$ can be aryl. In some embodiments, each $R^5$ can be phenyl. In some embodiments, each $R^5$ can be $C_{3-8}$ alkylene-$NR^{2a}R^{2b}$. In some embodiments, each $R^5$ can be $C_3$ alkylene-$NR^{2a}R^{2b}$. In some embodiments, each $R^5$ can independently be octadecyl or $C_3$ alkylene-$NR^{2b}R^{2b}$.

In some embodiments, where $R^2$ is $(CH_2)_pCH_2CH_2NR^{2a}R^{2b}$, the aminosilicone polymer of formula Ic can have the structure of formula Id:

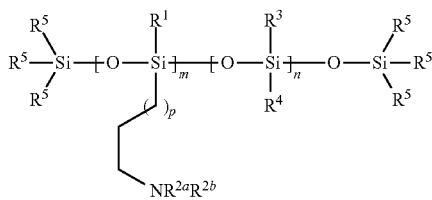

(Id)

wherein $R^1$, $R^{2a}$, $R^{2b}$, $R^3$, $R^4$, and $R^5$ are as defined above for formula Ic, subscripts m and n are each an integer from 10 to 14, and subscript p is an integer from 1 to 6.

In some embodiments, where $R^1$, $R^3$, and $R^5$ are methyl, $R^4$ is $C^{18}$ alkylene, and $R^2$ is $(CH_2)_p CH_2 CH_2 NR^{2a} R^{2b}$, the aminosilicone polymer of formula Ic can have the structure of formula Ie:

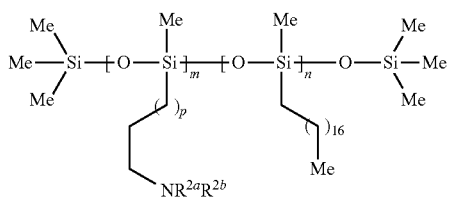

(Ie)

wherein $R^{2a}$ and $R^{2b}$ are as defined above for formula Ic, subscripts m and n are each an integer from 10 to 14, and subscript p is an integer from 1 to 6.

When the aminosilicone polymer has a single type of monomer repeat unit, such that subscript n is 0, the structure can be the structure of formula I, wherein each $R^1$ can independently be $C_{8-20}$ alkyl, $C_{8-20}$ alkenyl, $C_{8-20}$ alkynyl, cycloalkyl, or aryl. In some embodiments, each $R^1$ can independently be $C_{8-20}$ alkyl; subscript m can be an integer from 5 to 50; and subscript n can be 0.

In some embodiments, where n is 0, the aminosilicone polymer of formula Ic can have the structure of formula If:

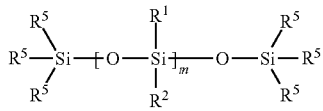

(If)

wherein $R^1$, $R^2$, and $R^5$ are as defined above for formula Ic and subscript m is an integer from 10 to 14.

In some embodiments, where subscript n is 0 and $R^2$ is $(CH_2)_p CH_2 CH_2 NR^{2a} R^{2b}$, the aminosilicone polymer of formula Ic can have the structure of formula Ig:

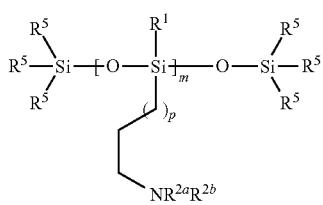

(Ig)

wherein $R^1$, $R^{2a}$, $R^{2b}$, and $R^5$ are as defined above for formula Ic, subscript m is an integer from 10 to 14, and subscript p is an integer from 1 to 6. In some embodiments, subscript p can be 1, 2, 3, 4, 5, or 6. In some embodiments, subscript p can be 1.

In some embodiments, where subscript n is 0, $R^1$ is $C_{18}$ alkyl, $R^2$ is $CH_2CH_2CH_2NR^{2a}R^{2b}$, and $R^5$ is methyl, the aminosilicone polymer of formula Ic can have the structure of formula Ih:

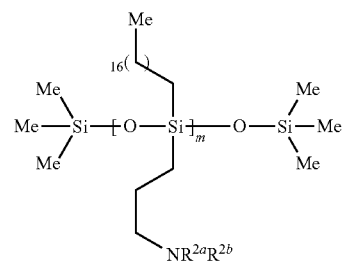

(Ih)

wherein $R^{2a}$ and $R^{2b}$ are as defined above for formula Ic and subscript m is an integer from 10 to 14.

In some embodiments, where subscript n is 0, $R^1$ and $R^5$ are $C_{18}$ alkyl, and $R^2$ is $CH_2CH_2CH_2NR^{2a}R^{2b}$, the aminosilicone polymer of formula Ic can have the structure of formula Ii:

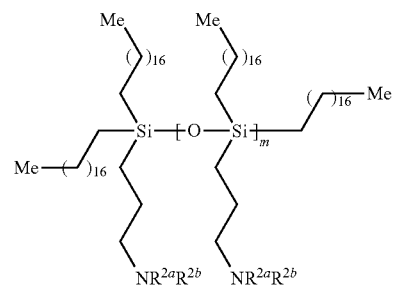

(Ii)

Whether the aminosilicone polymer is obtained from a commercial source or prepared de novo, the aminosilicone polymer can be of any suitable molecular weight, glass transition temperature, and viscosity.

The aminosilicone polymer can have any suitable molecular weight. In some embodiments, the aminosilicone polymer has a molecular weight of between about 1000 Daltons (Da) and about 20 kDa, about 1000 Da and about 10 kDa, about 1000 Da and about 5 kDa, about 1000 Da and about 2 kDa, about 2 kDa and about 20 kDa, about 2 kDa and about 10 kDa, about 2 kDa and about 5 kDa, about 5 kDa and about 20 kDa, about 5 kDa and about 10 kDa, or about 10 kDa and about 20 kDa.

Aminosilicone polymers can have a low glass transition temperature and a low viscosity, depending on the size of the polymer and the groups pendant to the polymer backbone. In some embodiments, the aminosilicone polymers can have a glass transition temperature of between about 1° C. and about 100° C., about 1° C. and about 60° C., about 1° C. and about 40° C., about 1° C. and about 20° C., about 10° C. and about 100° C., about 10° C. and about 60° C., about 10° C. and about 40° C., about 10° C. and about 20° C., about 20° C. and about 100° C., about 20° C. and about 60° C., about 20° C. and about 40° C., about 40° C. and about 100° C., about 40° C. and about 60° C., or about 60° C. and about 100° C. In some embodiments, the aminosilicone polymer can have a glass transition temperature of 90, 80, 70, 60, 50, 40, 30, 25, 20, 15, 10, 5, or 0° C. In some embodiments, the aminosilicone polymer can have a glass transition temperature of less than about 50° C. In other embodiments, the aminosilicone polymer can have a glass transition temperature of less than about 25° C.

In some embodiments, the aminosilicone polymer can have any suitable viscosity. In some embodiments, the aminosilicone polymer can have a viscosity of between about 1 centistokes (cSt) and about 5000 cSt, about 1 cSt and about 1000 cSt, about 1 cSt and about 500 cSt, about 1 cSt and about 100 cSt, about 1 cSt and about 50 cSt, about 1 cSt and about 10 cSt, about 1 cSt and about 5 cSt, about 5 cSt and about 5000 cSt, about 5 cSt and about 1000 cSt, about 5 cSt and about 500 cSt, about 5 cSt and about 100 cSt, about 5 cSt and about 50 cSt, about 5 cSt and about 10 cSt, about 10 cSt and about 5000 cSt, about 10 cSt and about 1000 cSt, about 10 cSt and about 500 cSt, about 10 cSt and about 100 cSt, about 10 cSt and about 50 cSt, about 50 cSt and about 5000 cSt, about 50 cSt and about 1000 cSt, about 50 cSt and about 500 cSt, about 50 cSt and about 100 cSt, about 100 cSt and about 5000 cSt, about 100 cSt and about 1000 cSt, about 100 cSt and about 500 cSt, about 500 cSt and about 5000 cSt, about 500 cSt and about 1000 cSt, or about 1000 cSt and about 5000 cSt.

In some embodiments, when the nanostructures are dispersed in the aminosilicone polymer, the resultant composition has a higher viscosity than the aminosilicone polymer alone.

In some embodiments, the nanostructure composition comprises at least one one aminosilicone polymer. In some embodiments, the nanostructure composition comprises between 1 and 5, 1 and 4, 1 and 3, 1 and 2, 2 and 5, 2 and 4, 2 and 3, 3 and 5, 3 and 4, or 4 and 5 aminosilicone polymers.

The aminosilicone polymer can be present in any suitable amount. For example, the aminosilicone polymer can be present in an amount that is more than, about the same as, or less than (weight/weight) compared to the nanostructures. In some embodiments, the weight ratio of aminosilicone polymer to nanostructures is between about 1000:1 and about 1:1000, about 1000:1 and about 1:500, about 1000:1 and about 1:200, about 1000:1 and about 1:100, about 1000:1 and about 1:50, about 1000:1 and about 1:10, about 1000:1 and about 1:1, about 500:1 and about 1:1000, about 500:1 and about 1:500, about 500:1 and about 1:200, about 500:1 and about 1:100, about 500:1 and about 1:50, about 500:1 and about 1:10, about 500:1 and about 1:1, about 200:1 and about 1:1000, about 200:1 and about 1:500, about 200:1 and about 1:200, about 200:1 and about 1:100, about 200:1 and about 1:50, about 200:1 and about 1:10, about 200:1 and about 1:1, about 100:1 and about 1:1000, about 100:1 and about 1:500, about 100:1 and about 1:200, about 100:1 and about 1:100, about 100:1 and about 1:50, about 100:1 and about 1:10, about 100:1 and about 1:1, about 50:1 and about 1:1000, about 50:1 and about 1:500, about 50:1 and about 1:200, about 50:1 and about 1:100, about 50:1 and about 1:50, about 50:1 and about 1:10, about 50:1 and about 1:1, about 10:1 and about 1:1000, about 10:1 and about 1:500, about 10:1 and about 1:200, about 10:1 and about 1:100, about 10:1 and about 1:50, about 10:1 and about 1:10, or about 10:1 and about 1:1. In some embodiments, the weight ratio of aminosilicone polymer to nanostructures is about 1000:1, about 500:1, about 200:1, about 100:1, about 50:1, about 10:1, about 1:1, about 1:10, about 1:50, about 1:100, about 1:200, about 1:500, or about 1:1000.

In some embodiments, the weight percent of aminosilicone polymer in the nanostructure composition is between about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 50%, about 1% and about 25%, about 1% and about 20%, about 1% and about 15%, about 1% and about 10%, about 1% and about 5%, about 1% and about 2%, about 2% and about 50%, about 2% and about 25%, about 2% and about 20%, about 2% and about 15%, about 2% and about 10%, about 2% and about 5%, about 5% and about 50%, about 5% and about 25%, about 5% and about 20%, about 5% and about 15%, about 5% and about 10%, about 10% and about 50%, about 10% and about 25%, about 10% and about 20%, about 10% and about 15%, about 15% and about 50%, about 15% and about 25%, about 15% and about 20%, about 20% and about 50%, about 20% and about 25%, or about 25% and about 50%.

In some embodiments, the weight percentage of the aminosilicone polymer in the nanostructure molded article is between about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 50%, about 1% and about 25%, about 1% and about 20%, about 1% and about 15%, about 1% and about 10%, about 10% and about 5%, about 10% and about 2%, about 2% and about 50%, about 2% and about 25%, about 2% and about 20%, about 2% and about 15%, about 2% and about 10%, about 2% and about 5%, 5% and about 50%, about 5% and about 25%, about 5% and about 20%, about 5% and about 15%, about 5% and about 10%, about 10% and about 50%, about 10% and about 25%, about 10% and about 20%, about 10% and about 15%, about 15% and about 50%, about 15% and about 25%, about 15% and about 20%, about 20% and about 50%, about 20% and about 25%, or about 25% and about 50%.

Solvents

In some embodiments, the nanostructure composition further comprises a solvent. In some embodiments, the solvent is selected from the group consisting of chloroform, acetone, butanone, ethylene glycol monoethyl ether, ethylene glycol monopropyl ether, ethylene glycol monobutyl ether, diethylene glycol diethyl ether acetic acetate, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof.

Organic Resin

In some embodiments, the organic resin is a thermosetting resin or a ultraviolet (UV) curable resin. In some embodiments, the organic resin is cured with a method that facilitates roll-to-roll processing.

Thermosetting resins require curing in which they undergo an irreversible molecular cross-linking process which renders the resin infusible. In some embodiments, the thermosetting resin is an epoxy resin, a phenolic resin, a vinyl resin, a melamine resin, a urea resin, an unsaturated polyester resin, a polyurethane resin, an allyl resin, an acrylic resin, a polyamide resin, a polyamide-imide resin, a phenolamine condensation polymerization resin, a urea melamine condensation polymerization resin, or combinations thereof.

In some embodiments, the thermosetting resin is an epoxy resin. Epoxy resins are easily cured without evolution of volatiles or by-products by a wide range of chemicals. Epoxy resins are also compatible with most substrates and tend to wet surfaces easily. See Boyle, M. A., et al., "Epoxy Resins," Composites, Vol. 21, ASM Handbook, pages 78-89 (2001).

In some embodiments, the organic resin is a silicone thermosetting resin. In some embodiments, the silicone thermosetting resin is OE6630A or OE6630B (Dow Corning Corporation, Auburn, MI).

In some embodiments, a thermal initiator is used. In some embodiments, the thermal initiator is [2,2'-azobis(2-methylpropionitrile)] (AIBN) or benzoyl peroxide.

UV curable resins are polymers that cure and quickly harden when exposed to a specific light wavelength. In some embodiments, the UV curable resin is a resin having as a functional group a radical-polymerization group such as a (meth)acrylyloxy group, a vinyloxy group, a styryl group, or a vinyl group; or a cation-polymerizable group such as an epoxy group, a thioepoxy group, a vinyloxy group, or an oxetanyl group. In some embodiments, the UV curable resin is a polyester resin, a polyether resin, a (meth)acrylic resin, an epoxy resin, a urethane resin, an alkyd resin, a spiroacetal resin, a polybutadiene resin, or a polythiolpolyene resin.

In some embodiments, the UV curable resin is selected from the group consisting of urethane acrylate, allyloxylated cyclohexyl diacrylate, bis(acryloxy ethyl)hydroxyl isocyanurate, bis(acryloxy neopentylglycol)adipate, bisphenol A diacrylate, bisphenol A dimethacrylate, 1,4-butanediol diacrylate, 1,4-butanediol dimethacrylate, 1,3-butyleneglycol diacrylate, 1,3-butyleneglycol dimethacrylate, dicyclopentanyl diacrylate, diethyleneglycol diacrylate, diethyleneglycol dimethacrylate, dipentaerythritol hexaacrylate, dipentaerythritol monohydroxy pentaacrylate, di(trimethylolpropane) tetraacrylate, ethyleneglycol dimethacrylate, glycerol methacrylate, 1,6-hexanediol diacrylate, neopentylglycol dimethacrylate, neopentylglycol hydroxypivalate diacrylate, pentaerythritol triacrylate, pentaerythritol tetraacrylate, phosphoric acid dimethacrylate, polyethyleneglycol diacrylate, polypropyleneglycol diacrylate, tetraethyleneglycol diacrylate, tetrabromobisphenol A diacrylate, triethyleneglycol divinylether, triglycerol diacrylate, trimethylolpropane triacrylate, tripropyleneglycol diacrylate, tris(acryloxyethyl) isocyanurate, phosphoric acid triacrylate, phosphoric acid diacrylate, acrylic acid propargyl ester, vinyl terminated polydimethylsiloxane, vinyl terminated diphenylsiloxane-dimethylsiloxane copolymer, vinyl terminated polyphenylmethylsiloxane, vinyl terminated trifluoromethylsiloxane-dimethylsiloxane copolymer, vinyl terminated diethylsiloxane-dimethylsiloxane copolymer, vinylmethylsiloxane, monomethacryloyloxypropyl terminated polydimethyl siloxane, monovinyl terminated polydimethyl siloxane, monoallyl-mono trimethylsiloxy terminated polyethylene oxide, and combinations thereof.

In some embodiments, the UV curable resin is a mercaptofunctional compound that can be cross-linked with an isocyanate, an epoxy, or an unsaturated compound under UV curing conditions. In some embodiments, the polythiol is pentaerythritol tetrakis(3-mercapto-propionate) (PETMP); trimethylol-propane tri(3-mercapto-propionate) (TMPMP); glycol di(3-mercapto-propionate) (GDMP); tris[25-(3-mercapto-propionyloxy)ethyl]isocyanurate (TEMPIC); di-pentaerythritol hexa(3-mercapto-propionate) (Di-PETMP); ethoxylated trimethylolpropane tri(3-mercapto-propionate) (ETTMP 1300 and ETTMP 700); polycaprolactone tetra(3-mercapto-propionate) (PCL4MP 1350); pentaerythritol tetramercaptoacetate (PETMA); trimethylol-propane trimercaptoacetate (TMPMA); or glycol dimercaptoacetate (GDMA). These compounds are sold under the trade name THIOCURE® by Bruno Bock, Marschacht, Germany.

In some embodiments, the UV curable resin is a polythiol. In some embodiments, the UV curable resin is a polythiol selected from the group consisting of ethylene glycol bis (thioglycolate), ethylene glycol bis(3-mercaptopropionate), trimethylol propane tris (thioglycolate), trimethylol propane tris (3-mercaptopropionate), pentaerythritol tetrakis (thioglycolate), pentaerythritol tetrakis(3-mercaptopropionate) (PETMP), and combinations thereof. In some embodiments, the UV curable resin is PETMP.

In some embodiments, the UV curable resin is a thiol-ene formulation comprising a polythiol and 1,3,5-Triallyl-1,3,5-triazine-2,4,6 (1H,3H,5H)-trione (TTT). In some embodiments, the UV curable resin is a thiol-ene formulation comprising PETMP and TTT.

In some embodiments, the UV curable resin further comprises a photoinitiator. A photoinitiator initiates the curing reaction of the photosensitive material during exposure to light. In some embodiments, the photoinitiator is acetophenone-based, benzoin-based, or thioxathenone-based.

In some embodiments, the photoiniator is a vinyl acrylate-based resin. In some embodiments, the photoinitiator is MINS-311RM (Minuta Technology Co., Ltd, Korea).

In some embodiments, the photoinitiator is IRGACURE® 127, IRGACURE® 184, IRGACURE® 184D, IRGACURE® 2022, IRGACURE® 2100, IRGACURE® 250, IRGACURE® 270, IRGACURE® 2959, IRGACURE® 369, IRGACURE® 369 EG, IRGACURE® 379, IRGACURE® 500, IRGACURE® 651, IRGACURE® 754, IRGACURE® 784, IRGACURE® 819, IRGACURE® 819Dw, IRGACURE® 907, IRGACURE® 907 FF, IRGACURE® Oxe01, IRGACURE® TPO-L, IRGACURE® 1173, IRGACURE® 1173D, IRGACURE® 4265, IRGACURE® BP, or IRGACURE® MBF (BASF Corporation, Wyandotte, MI). In some embodiments, the photoinitiator is TPO (2,4,6-trimethylbenzoyl-diphenyl-phosphine oxide) or MBF (methyl benzoylformate).

In some embodiments, the weight percentage of the organic resin in the nanostructure composition is between about 5% and about 50%, about 5% and about 40%, about 5% and about 30%, about 5% and about 20%, about 5% and about 10%, about 10% and about 50%, about 10% and about 40%, about 10% and about 30%, about 10% and about 20%, about 20% and about 50%, about 20% and about 40%, about 20% and about 30%, about 30% and about 50%, about 30% and about 40%, or about 40% and about 50%.

In some embodiments, the weight percentage of the organic resin in the nanostructure molded article is between about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 50%, about 1% and about 25%, about 1% and about 20%, about 1% and about 15%, about 1% and about 10%, about 1% and about 5%, about 1% and about 2%, about 2% and about 50%, about 2% and about 25%, about 2% and about 20%, about 2% and about 15%, about 2% and about 10%, about 2% and about 5%, about 5% and about 50%, about 5% and about 25%, about 5% and about 20%, about 5% and about 15%, about 5% and about 10%, about 10% and about 50%, about 10% and about 25%, about 10% and about 20%, about 10% and about 15%, about 15% and about 50%, about 15% and about 25%, about 15% and about 20%, about 20% and about 50%, about 20% and about 25%, or about 25% and about 50%.

Acids

The addition of an acid to a composition comprising an aminosilicone causes a rapid increase in the viscosity, gelling, and/or solidification of the aminosilicone within the composition.

Unaltered aminosilicone with a viscosity of ~75 centipoise (cP) was thickened to >48,540 cP with the addition of an acid. The aminosilicone was observed to fully solidify upon acid addition.

In some embodiments, the at least one acid added to the composition is an inorganic acid. In some embodiments, the at least one acid added to the composition is an organic acid.

In some embodiments, the at least one acid is an inorganic acid selected from the group consisting of sulfurous acid, hyposulfurous acid, pyrosulfuric acid, dithionous acid, thiosulfurous acid, peroxydisulfuric acid, hydrochloric acid, chlorous acid, hyponitrous acid, nitric acid, carbonous acid, hypocarbonous acid, oxalic acid, phosphoric acid, hypophosphous acid, hypophosphoric acid, hydrophosphoric acid, bromous acid, hypobromous acid, iodous acid, periodic acid, fluorous acid, hypofluorous acid, hydrofluoric acid, chromous acid, perchromic acid, selenic acid, hydronitric acid, molybdic acid, silicofluoric acid, tellurous acid, xenic acid, formic acid, permanganic acid, antimonic acid, silicic acid, arsenic acid, hydroarsenic acid, tetraboric acid, hypooxalous acid, cyanic acid, hydrocyanic acid, uranic acid, sulfuric acid, persulfuric acid, disulfurous acid, tetrathionic acid, hydrosulfuric acid, perchloric acid, hypochlorous acid, chloric acid, nitrous acid, pernitric acid, percarbonic acid, phosphorous acid, perphosphoric acid, hydrobromic acid, bromic acid, hypoiodous acid, iodic acid, fluoric acid, perfluoric acid, chromic acid, hypochromous acid, hydroselenic acid, selenous acid, boric acid, perxenic acid, telluric acid, tungstic acid, pyroantimonic acid, manganic acid, antimonous acid, titanic acid, pertechnetic acid, dichromic acid, metastannic acid, ferrcyanic acid, silicous acid, thiocyanic acid, and diuranic acid.

In some embodiments, the at least one acid is an organic acid selected from the group consisting of malonic acid, tartartic acid, phthalic acid, barbituric acid, cinnamic acid, glutaric acid, hexanoic acid, malic acid, folic acid, propionic acid, stearic acid, trifluoroacetic acid, ascorbic acid, acetylsalicylic acid, citric acid, glutamic acid, azelaic acid, benzilic acid, fumaric acid, gluconic acid, lactic acid, oleic acid, propiolic acid, rosolic acid, tannic acid, uric acid, gallic acid, and acetic acid. In some embodiments, the organic acid is diisooctylphosphinic acid (DIOPA), oxalic acid, oleic acid, octanoic acid, propionic acid, or decanoic acid. In some embodiments, the organic acid is DIOPA. In some embodiments, the organic acid is oxalic acid. In some embodiments, the organic acid is oleic acid. In some embodiments, the organic acid is octanoic acid. In some embodiments, the organic acid is propanoic acid. In some embodiments, the organic acid is decanoic acid.

"Carboxylic acid" as used herein refers to a compound that contains a carboxyl group and has the general formula R—COOH, wherein R is an alkyl, an optionally substituted alkyl, an aryl, an optionally substituted aryl, a heteroaryl, or an optionally substituted heteroaryl.

In some embodiments, the at least one acid is a carboxylic acid selected from the group consisting of formic acid, acetic acid, oxalic acid, glyoxylic acid, glycolic acid, propanoic acid, prop-2-enoic acid, 2-propynoic acid, propanedioic acid, 2-hydroxypropanedioic acid, oxopropanedioic acid, 2,2,-dihydropropanedioic acid, 2-oxopropanoic acid, 2-hydroxypropanoic acid, 3-hydroxypropanoic acid, 2-oxiranecarboxylic acid, butanoic acid, 2-methylpropanoic acid, butanedioic acid, 3-oxobutanoic acid, butenedioic acid, oxobutanedioic acid, hydroxybutanedioic acid, 2,3-dihydroxybutanedioic acid, but-2-enoic acid, pentanoic acid, 3-methylbutanoic acid, pentanedioic acid, 2-oxopentanedioic acid, hexanoic acid, hexanedioic acid, 2-hydroxypropane-1,2,3-tricarboxylic acid, prop-1-ene-1,2,3-tricarboxylic acid, 1-hydroxypropane-1,2,3-tricarboxylic acid, (2E,4E)-hexa-2,4-dienoic acid, heptanoic acid, heptanedioic acid, cyclohexanecarboxylic acid, benzenecarboxylic acid, 2-hydroxybenzoic acid, octanoic acid, benzene-1,2-dicarboxylic acid, nonanoic acid, benzene-1,3,5-tricarboxylic acid, E-3-phenylprop-2-enoic acid, decanoic acid, decanedioic acid, undecanoic acid, dodecanoic acid, benzene-1,2,3,4,5,6-hexacarboxylic acid, tridecanoic acid, tetradecanoic acid, pentadecanoic acid, hexadecanoic acid, heptadecanoic acid, octadecanoic acid, (9Z)-octadec-9-enoic acid, (9Z,12Z)-octadeca-9,12-dienoic acid, (9Z,12Z,15Z)-octadeca-9,12,15-trienoic acid, nonadecanoic acid, eicosanoic acid, heneicosanoic acid, tricosanoic acid, tetracosanoic acid, pentacosanoic acid, or hexacosanoic acid.

In some embodiments, the concentration of the acid added to the composition is between about 0.1 M and about 5 M, about 0.1 M and about 4 M, about 0.1 M and about 3 M, about 0.1 M and about 2 M, about 0.1 M and about 2 M, about 0.5 M and about 5 M, about 0.5 M and about 4 M, about 0.5 M and about 3 M, about 0.5 M and about 2 M, about 0.5 M and about 1 M, about 1 M and about 5 M, about 1 M and about 4 M, about 1 M and about 3 M, about 1 M and about 2 M, about 2 M and about 5 M, about 2 M and about 4 M, about 2 M and about 3 M, about 3 M and about 5 M, about 3 M and about 4 M, or about 4 M and about 5 M.

In some embodiments, the molar ratio of the aminosilicone polymer to the acid is between about 1:1 and about 1:1000. In some embodiments, the molar ratio of the aminosilicone polymer to the acid is between about 1:1 and about 1:1000, about 1:1 and about 1:500, about 1:1 and about 1:250, about 1:1 and about 1:100, about 1:1 and about 1:50, about 1:2 and about 1:1000, about 1:2 and about 1:500, about 1:2 and about 1:250, about 1:2 and about 1:100, about 1:2 and about 1:50, about 1:5 and about 1:1000, about 1:5 and about 1:500, about 1:5 and about 1:250, about 1:5 and about 1:100, about 1:5 and about 1:50, about 1:10 and about 1:1000, about 1:10 and about 1:500, about 1:10 and about 1:250, about 1:10 and about 1:100, or about 1:10 and about 1:50. In some embodiments, the molar ratio of the aminosilicone polymer to the acid is between about 1:5 and about 1:20.

In some embodiments, the weight percentage of the acid added to the nanostructure composition based on the total weight of the nanostructure composition is between about 0.1% and about 5%, about 0.1% and about 4%, about 0.1% and about 3%, about 0.1% and about 2%, about 0.1% and about 1%, about 0.1% and 0.5%, about 0.5% and about 5%, about 0.5% and about 4%, about 0.5% and about 3%, about 0.5% and about 2%, about 0.5% and about 1%, about 1% and about 5%, about 1% and about 4%, about 1% and about 3%, about 1% and about 2%, about 2% and about 5%, about 2% and about 4%, about 2% and about 3%, about 3% and about 5%, about 3% and about 4%, or about 4% and about 5%.

In some embodiments, the weight percentage of the acid added to the nanostructure molded article based on the total weight of the nanostructure molded article is between about 0.1% and about 5%, about 0.1% and about 4%, about 0.1% and about 3%, about 0.1% and about 2%, about 0.1% and about 1%, about 0.1% and 0.5%, about 0.5% and about 5%, about 0.5% and about 4%, about 0.5% and about 3%, about 0.5% and about 2%, about 0.5% and about 1%, about 1% and about 5%, about 1% and about 4%, about 1% and about 3%, about 1% and about 2%, about 2% and about 5%, about 2% and about 4%, about 2% and about 3%, about 3% and about 5%, about 3% and about 4%, or about 4% and about 5%.

In some embodiments, the acid is added to the composition at a temperature between about −5° C. and about 100° C., about −5° C. and about 75° C., about −5° C. and about 50° C., about −5° C. and about 23° C., about 23° C. and about 100° C., about 23° C. and about 75° C., about 23° C. and about 50° C., about 50° C. and about 100° C., about 50° C. and about 75° C., or about 75° C. and about 100° C. In some embodiments, the acid is added to the composition at a temperature between about 23° C. and about 50° C.

In some embodiments, the acid is added to the composition over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours. In some embodiments the acid is added to the composition over a period of between about 10 minutes and about 50 minutes.

When the at least one aminosilicone polymer is combined with the at least one acid, it is understood that a portion of the amino groups on the aminosilicone are protonated to give an ammonium salt with one or more negative counterions.

The percentage of protonation of the amine groups on the aminosilicone polymer can be measured by methods known in the art. By way of example, percentage of protonation can be characterized by nuclear magnetic resonance (NMR) spectroscopy or by acid/base titration.

In some embodiments, the percentage of amine groups in the aminosilicone polymer that are complexed to a cation after addition of an acid to the nanostructure composition is between about 1% and about 100%, about 1% and about 80%, about 1% and about 50%, about 1% and about 40%, about 1% and about 30%, about 1% and about 20%, about 1% and about 10%, about 10% and about 100%, about 10% and about 80%, about 10% and about 50%, about 10% and about 40%, about 10% and about 30%, about 10% and about 20%, about 20% and about 100%, about 20% and about 80%, about 20% and about 50%, about 20% and about 40%, about 20% and about 30%, about 30% and about 100%, about 30% and about 80%, about 30% and about 50%, about 30% and about 40%, about 40% and about 100%, about 40% and about 80%, about 40% and about 50%, about 50% and about 100%, about 50% and about 80%, or about 80% and about 100%.

In some embodiments, the percentage of amine groups in the aminosilicone polymer that are complexed to a cation after addition of an acid to the nanostructure molded article is between about 1% and about 100%, about 1% and about 80%, about 1% and about 50%, about 1% and about 40%, about 1% and about 30%, about 1% and about 20%, about 1% and about 10%, about 10% and about 100%, about 10% and about 80%, about 10% and about 50%, about 10% and about 40%, about 10% and about 30%, about 10% and about 20%, about 20% and about 100%, about 20% and about 80%, about 20% and about 50%, about 20% and about 40%, about 20% and about 30%, about 30% and about 100%, about 30% and about 80%, about 30% and about 50%, about 30% and about 40%, about 40% and about 100%, about 40% and about 80%, about 40% and about 50%, about 50% and about 100%, about 50% and about 80%, or about 80% and about 100%.

In some embodiments, the viscosity of the aminosilicone within the composition after addition of at least one acid is between about 100 cP and about 10,000 poise, about 100 cP and about 5,000 poise, about 100 cP and about 1,000 poise, about 100 cP and about 500 poise, about 100 cP and about 100 poise, about 100 cP and about 50 poise, about 100 cP and about 10 poise, about 100 cP and about 5 poise, about 5 poise and about 10,000 poise, about 5 poise and about 5,000 poise, about 5 poise and about 1,000 poise, about 5 poise and about 500 poise, about 5 poise and about 100 poise, about 5 poise and about 50 poise, about 5 poise and about 10 poise, about 10 poise and about 10,000 poise, about 10 poise and about 5,000 poise, about 10 poise and about 1,000 poise, about 10 poise and about 500 poise, about 10 poise and about 100 poise, about 10 poise and about 50 poise, about 50 poise and about 10,000 poise, about 50 poise and about 5,000 poise, about 50 poise and about 1,000 poise, about 50 poise and about 500 poise, about 50 poise and about 100 poise, about 100 poise and about 10,000 poise, about 100 poise and about 5,000 poise, about 100 poise and about 1,000 poise, about 100 poise and about 500 poise, about 500 poise and about 10,000 poise, about 500 poise and about 5,000 poise, about 500 poise and about 1,000 poise, about 1000 poise and about 10,000 poise, about 1000 poise and about 5,000 poise, or about 5,000 poise and 10,000 poise.

In some embodiments, the viscosity (in cP) of the aminosilicone within the composition after addition of the at least one acid shows an increase of between about 10% and about 5000%, about 10% and about 1000%, about 10% and about 500%, about 10% and about 100%, about 10% and about 50%, about 50% and about 5000%, about 50% and about 1000%, about 50% and about 500%, about 50% and about 100%, about 100% and about 5000%, about 100% and about 1000%, about 100% and about 500%, about 500% and about 5000%, about 500% and about 1000%, or about 1000% and about 5000%.

Metal Ions and Complexes

In some embodiments, a metal ion or metal ion complex that complexes and clusters the amine groups of an aminosilicone can be used in place of the at least one acid. The metal ion or metal ion complex will increase the viscosity of the aminosilicone.

In some embodiments, the metal ion is selected from the group consisting of $Li^+$, $Na^+$, $K^+$, $Mg^{2+}$, and $Al^{3+}$.

In some embodiments, the metal ion complex is selected from the group consisting of LiTFSI, LiTF, LiFSI, LiBETI, LiDCMI, LiFNF, LiClO$_4$, LiSO$_4$, LiNO$_3$, NaTFSI, NaTF, NaFSI, NaBETI, NaDCMI, NaFNF, NaClO$_4$, NaSO$_4$, NaNO$_3$, KTFSI, KTF, KFSI, KBETI, KDCMI, KFNF, KClO$_4$, KSO$_4$, KNO$_3$, Mg(TFSI)$_2$, Mg(TF)$_2$, Mg(FSI)$_2$, Mg(BETI)$_2$, Mg(DCMI)$_2$, Mg(FNF)$_2$, Mg(ClO$_4$)$_2$, Mg(SO$_4$)$_2$, Mg(N$_{03}$)$_2$, Al(TFSI)$_3$, Al(TF)$_3$, Al(FSI)$_3$, Al(BETI)$_3$, Al(DCMI)$_3$, Al(FNF)$_3$, Al(ClO$_4$)$_3$, Al(SO$_4$)$_3$, and Al(NO$_3$)$_3$.

In some embodiments, the metal ion complex is selected from the group consisting of LiTFSI, LiTF, NaTFSI, NaFSI, KTFSI, KBETI, and Mg(TFSI)$_2$.

In some embodiments, the concentration of the metal ion or metal ion complex added to the composition is between about 0.1 M and about 5 M, about 0.1 M and about 4 M, about 0.1 M and about 3 M, about 0.1 M and about 2 M, about 0.1 M and about 2 M, about 0.5 M and about 5 M, about 0.5 M and about 4 M, about 0.5 M and about 3 M, about 0.5 M and about 2 M, about 0.5 M and about 1 M, about 1 M and about 5 M, about 1 M and about 4 M, about 1 M and about 3 M, about 1 M and about 2 M, about 2 M and about 5 M, about 2 M and about 4 M, about 2 M and about 3 M, about 3 M and about 5 M, about 3 M and about 4 M, or about 4 M and about 5 M.

In some embodiments, the molar ratio of the aminosilicone polymer to the metal ion or metal ion complex is between about 1:1 and about 1:1000. In some embodiments, the molar ratio of the aminosilicone polymer to the metal ion or metal ion complex is between about 1:1 and about 1:1000, about 1:1 and about 1:500, about 1:1 and about 1:250, about 1:1 and about 1:100, about 1:1 and about 1:50, about 1:2 and about 1:1000, about 1:2 and about 1:500, about 1:2 and about 1:250, about 1:2 and about 1:100, about 1:2 and about 1:50, about 1:5 and about 1:1000, about 1:5 and about 1:500, about 1:5 and about 1:250, about 1:5 and about 1:100, about 1:5 and about 1:50, about 1:10 and about 1:1000, about 1:10 and about 1:500, about 1:10 and about 1:250, about 1:10 and about 1:100, or about 1:10 and about 1:50. In some embodiments, the molar ratio of the aminosilicone polymer to the metal ion or metal ion complex is between about 1:5 and about 1:20.

In some embodiments, the weight percentage of the metal ion or metal ion complex added to the nanostructure composition based on the total weight of the nanostructure composition is between about 0.1% and about 5%, about 0.1% and about 4%, about 0.1% and about 3%, about 0.1% and about 2%, about 0.1% and about 1%, about 0.1% and 0.5%, about 0.5% and about 5%, about 0.5% and about 4%, about 0.5% and about 3%, about 0.5% and about 2%, about 0.5% and about 1%, about 1% and about 5%, about 1% and about 4%, about 1% and about 3%, about 1% and about 2%, about 2% and about 5%, about 2% and about 4%, about 2% and about 3%, about 3% and about 5%, about 3% and about 4%, or about 4% and about 5%.

In some embodiments, the weight percentage of the metal ion or metal ion complex added to the nanostructure molded article based on the total weight of the nanostructure molded article is between about 0.1% and about 5%, about 0.1% and about 4%, about 0.1% and about 3%, about 0.1% and about 2%, about 0.1% and about 1%, about 0.1% and 0.5%, about 0.5% and about 5%, about 0.5% and about 4%, about 0.5% and about 3%, about 0.5% and about 2%, about 0.5% and about 1%, about 1% and about 5%, about 1% and about 4%, about 1% and about 3%, about 1% and about 2%, about 2% and about 5%, about 2% and about 4%, about 2% and about 3%, about 3% and about 5%, about 3% and about 4%, or about 4% and about 5%.

In some embodiments, the metal ion or metal ion complex is added to the composition at a temperature between about −5° C. and about 100° C., about −5° C. and about 75° C., about −5° C. and about 50° C., about −5° C. and about 23° C., about 23° C. and about 100° C., about 23° C. and about 75° C., about 23° C. and about 50° C., about 50° C. and about 100° C., about 50° C. and about 75° C., or about 75° C. and about 100° C. In some embodiments, the acid is added to the composition at a temperature between about 23° C. and about 50° C.

In some embodiments, the metal ion or metal ion complex is added to the composition over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours. In some embodiments the acid is added to the composition over a period of between about 10 minutes and about 50 minutes.

When the at least one aminosilicone polymer is combined with the at least one metal ion or metal ion complex, it is understood that a portion of the amino groups on the aminosilicone are complexed to give an ammonium salt with an anionic counterion.

In some embodiments, the percentage of amine groups in the aminosilicone polymer that are complexed to a cation after addition of a metal ion or metal ion complex to the nanostructure composition is between about 1% and about 100%, about 1% and about 80%, about 1% and about 50%, about 1% and about 40%, about 1% and about 30%, about 1% and about 20%, about 1% and about 10%, about 10% and about 100%, about 10% and about 80%, about 10% and about 50%, about 10% and about 40%, about 10% and about 30%, about 10% and about 20%, about 20% and about 100%, about 20% and about 80%, about 20% and about 50%, about 20% and about 40%, about 20% and about 30%, about 30% and about 100%, about 30% and about 80%, about 30% and about 50%, about 30% and about 40%, about 40% and about 100%, about 40% and about 80%, about 40% and about 50%, about 50% and about 100%, about 50% and about 80%, or about 80% and about 100%.

In some embodiments, the percentage of amine groups in the aminosilicone polymer that are complexed to a cation after addition of a metal ion or metal ion complex to the nanostructure film layer is between about 1% and about 50%, about 1% and about 40%, about 1% and about 100%, about 1% and about 80%, about 1% and about 50%, about 1% and about 40%, about 1% and about 30%, about 1% and about 20%, about 1% and about 10%, about 10% and about 100%, about 10% and about 80%, about 10% and about 50%, about 10% and about 40%, about 10% and about 30%, about 10% and about 20%, about 20% and about 100%, about 20% and about 80%, about 20% and about 50%, about 20% and about 40%, about 20% and about 30%, about 30% and about 100%, about 30% and about 80%, about 30% and about 50%, about 30% and about 40%, about 40% and about 100%, about 40% and about 80%, about 40% and about 50%, about 50% and about 100%, about 50% and about 80%, or about 80% and about 100%.

In some embodiments, the percentage of amine groups in the aminosilicone polymer that are complexed to a cation after addition of a metal ion or metal ion complex to the nanostructure molded article is between about 1% and about 100%, about 1% and about 80%, about 1% and about 50%, about 1% and about 40%, about 1% and about 30%, about 1% and about 20%, about 1% and about 10%, about 10% and about 100%, about 10% and about 80%, about 10% and about 50%, about 10% and about 40%, about 10% and about 30%, about 10% and about 20%, about 20% and about 100%, about 20% and about 80%, about 20% and about 50%, about 20% and about 40%, about 20% and about 30%, about 30% and about 100%, about 30% and about 80%, about 30% and about 50%, about 30% and about 40%, about 40% and about 100%, about 40% and about 80%, about 40% and about 50%, about 50% and about 100%, about 50% and about 80%, or about 80% and about 100%.

In some embodiments, the viscosity of the aminosilicone within the composition after addition of at least one metal ion or metal ion complex is between about 100 cP and about 10,000 poise, about 100 cP and about 5,000 poise, about 100 cP and about 1,000 poise, about 100 cP and about 500 poise, about 100 cP and about 100 poise, about 100 cP and about 50 poise, about 100 cP and about 10 poise, about 100 cP and about 5 poise, about 5 poise and about 10,000 poise, about 5 poise and about 5,000 poise, about 5 poise and about 1,000 poise, about 5 poise and about 500 poise, about 5 poise and about 100 poise, about 5 poise and about 50 poise, about 5 poise and about 10 poise, about 10 poise and about 10,000 poise, about 10 poise and about 5,000 poise, about 10 poise and about 1,000 poise, about 10 poise and about 500 poise, about 10 poise and about 100 poise, about 10 poise and about 50 poise, about 50 poise and about 10,000 poise, about 50 poise and about 5,000 poise, about 50 poise and about 1,000 poise, about 50 poise and about 500 poise, about 50 poise and about 100 poise, about 100 poise and about 10,000 poise, about 100 poise and about 5,000 poise, about 100 poise and about 1,000 poise, about 100 poise and about 500 poise, about 500 poise and about 10,000 poise, about 500 poise and about 5,000 poise, about 500 poise and about 1,000 poise, about 1000 poise and about 10,000 poise, about 1000 poise and about 5,000 poise, or about 5,000 poise and 10,000 poise.

In some embodiments, the viscosity (in cP) of the aminosilicone within the composition after addition of the at least one metal ion or metal ion complex shows an increase of between about 10% and about 5000%, about 10% and about 1000%, about 10% and about 500%, about 10% and about 100%, about 10% and about 50%, about 50% and about 5000%, about 50% and about 1000%, about 50% and about 500%, about 50% and about 100%, about 100% and about 5000%, about 100% and about 1000%, about 1000% and about 500%, about 500% and about 5000%, about 500% and about 1000%, or about 1000% and about 5000%.

Making the Nanostructure Compositions

The present invention provides a method of making a nanostructure composition comprising admixing at least one population of nanostructures and at least one aminosilicone polymer, at least one cation, and optionally at least one organic resin. In one embodiment, the cation is the proton of an acid. In another embodiment, the cation is a metal cation of a metal ion salt or a metal ion complex salt.

The present invention provides a method of preparing a nanostructure composition, the method comprising:
(a) providing a composition comprising at least one population of nanostructures and at least one aminosilicone polymer;
(b) admixing at least one organic resin with the composition of (a); and
(c) admixing at least one cation, with the composition of (b), wherein the weight percentage of the cation, in the form of an acid or metal ion salt or metal ion complex salt, admixed with the nanostructure composition, is between about 0.1% and about 5% based on the total weight of the nanostructure composition.

The present invention provides a method of preparing a nanostructure composition, the method comprising:
(a) providing a composition comprising at least one population of nanostructures, at least one aminosilicone polymer, and at least one organic resin; and
(b) admixing at least one cation, in the form of an acid or metal ion salt or metal ion complex salt, with the composition of (a).

The present invention provides a method of making a nanostructure composition comprising admixing at least one population of nanostructures and at least one aminosilicone polymer, at least cation in the form of an acid or metal ion salt or metal ion complex salt, and optionally at least one organic resin.

The aminosilicone polymer provides increased stability to the population of nanostructures and allows for storage of the nanostructures for extended periods of time. In some embodiments, the population of nanostructures can be stored in an aminosilicone polymer for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

In some embodiments, if more than one population of nanostructures is used, the at least one first population of nanostructures stored in at least one first aminosilicone polymer is added to at least one second population of nanostructures stored in at least one first aminosilicone polymer. In some embodiments, the first and second aminosilicione polymers are the same. In some embodiments, the first and second aminosilicone polymers are different.

In some embodiments, a first population of nanostructures in an aminosilicone polymer is mixed with a second population of nanostructures in an aminosilicone polymer at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, a first population of nanostructures in an aminosilicone polymer is mixed with a second population of nanostructures in an aminosilicone polymer for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, at least one acid is added to the at least one population of nanostructures and the at least one aminosilicone. The acid will protonate the amino functional groups of the aminosilicone polymer which causes a rapid increase in the viscosity of the aminosilicone.

In some embodiments, the at least one population of nanostructures in at least one aminosilicone polymer is mixed with at least one acid at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the at least one population of nanostructures in at least one aminosilicone polymer is mixed with at least one acid for a time of between about 1 minute and about 24 hours, about 1 minute and about 20 hours, about 1 minute and about 15 hours, about 1 minute and about 10 hours, about 1 minute and about 5 hours, about 1 minute and about 1 hour, about 1 minute and about 30 minutes, about 1 minute and about 10 minutes, about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, provided is a composition comprising at least one population of nanostructures and at least one aminosilicone polymer, wherein between about 1% and about 100% of the amine groups in the aminosilicone polymer are protonated, can be stably stored for between about 1 minute and about 6 months, about 1 minute and about 3 months, about 1 minute and about 1 month, about 1 minute and about 15 days, about 1 minute and about 1 day, about 1 day and about 6 months, about 1 day and about 3 months, about 1 day and about 1 month, about 1 day and about 15 days, about 15 days and about 6 months, about 15 days and about 3 months, about 15 days and about 1 month, about 1 month and about 6 months, about 1 month and about 3 months, or about 3 months and about 6 months.

In some embodiments, if more than one organic resin is used, the organic resins are added together and mixed. In some embodiments, a first organic resin is mixed with a second organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm. In some embodiments, the mixture further comprises at least one solvent.

In some embodiments, a first organic resin is mixed with a second organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, provided is a composition comprising at least one population of nanostructures and at least one aminosilicone polymer, wherein between about 1% and about 50% of the amine groups in the aminosilicone polymer are protonated, is mixed with at least one organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm. In some embodiments, the mixture further comprises at least one solvent.

In some embodiments, provided is a composition comprising at least one population of nanostructures and at least one aminosilicone polymer, wherein between about 1% and about 50% of the amine groups in the aminosilicone polymer are protonated, is mixed with at least one organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, at least one population of nanostructures, at least one aminosilicone polymer, and at least one organic resin are mixed. In some embodiments, the organic resin does not react with the aminosilicone polymer and the mixture can be stored for extended lengths of time.

In some embodiments, the composition comprising at least one population of nanostructures, at least one aminosilicone polymer, and at least one organic resin can be stably stored for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

In some embodiments, the composition comprising at least one population of nanostructures, at least one aminosilicone, and at least one organic resin is mixed with an acid at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm. In some embodiments, the composition further comprises at least one solvent.

In some embodiments, the composition comprising at least one population of nanostructures, at least one aminosilicone, and at least one organic resin is mixed with an acid for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, a thermal initiator or a photoinitiator can be added to the nanostructure composition to facilitate curing.

Making a Nanostructure Layer

The nanostructures used in the present invention can be embedded in a polymeric matrix using any suitable method. As used herein, the term "embedded" is used to indicate that the nanostructure population is enclosed or encased with the polymer that makes up the majority of the component of the matrix. The some embodiments, the at least one nanostructure population is suitably uniformly distributed throughout the matrix. In some embodiments, the at least one nanostructure population is distributed according to an application-specific distribution. In some embodiments, the nanostructures are mixed in a polymer and applied to the surface of a substrate.

The nanostructure composition can be deposited by any suitable method known in the art, including but not limited to painting, spray coating, solvent spraying, wet coating, adhesive coating, spin coating, tape-coating, roll coating, flow coating, inkjet vapor jetting, drop casting, blade coating, mist deposition, or a combination thereof. Preferably, the nanostructure composition is cured after deposition. Suitable curing methods include photo-curing, such as UV curing, and thermal curing. Traditional laminate film processing methods, tape-coating methods, and/or roll-to-roll fabrication methods can be employed in forming the nanostructure films. The nanostructure composition can be coated directly onto the desired layer of a substrate. Alternatively, the nanostructure composition can be formed into a solid layer as an independent element and subsequently applied to the substrate. In some embodiments, the nanostructure composition can be deposited on one or more barrier layers.

Spin Coating

In some embodiments, the nanostructure composition is deposited onto a substrate using spin coating. In spin coating a small amount of material is typically deposited onto the center of a substrate loaded a machine called the spinner which is secured by a vacuum. A high speed of rotation is applied on the substrate through the spinner which causes centripetal force to spread the material from the center to the edge of the substrate. While most of the material would be spun off, a certain amount remains of the substrate, forming a thin film of material on the surface as the rotation continues. The final thickness of the film is determined by the nature of the deposited material and the substrate in addition to the parameters chosen for the spin process such as spin speed, acceleration, and spin time. For typical films, a spin speed of 1500 to 6000 rpm is used with a spin time of 10-60 seconds.

Mist Deposition

In some embodiments, the nanostructure composition is deposited onto a substrate using mist deposition. Mist deposition takes place at room temperature and atmospheric pressure and allows precise control over film thickness by changing the process conditions. During mist deposition, a liquid source material is turned into a very fine mist and carried to the deposition chamber by nitrogen gas. The mist is then drawn to the wafer surface by a high voltage potential between the field screen and the wafer holder. Once the droplets coalesce on the wafer surface, the wafer is removed from the chamber and thermally cured to allow the solvent to evaporate. The liquid precursor is a mixture of solvent and material to be deposited. It is carried to the atomizer by pressurized nitrogen gas. Price, S. C., et al., "Formation of Ultra-Thin Quantum Dot Films by Mist Deposition," *ESC Transactions* 11:89-94 (2007).

Spray Coating

In some embodiments, the nanostructure composition is deposited onto a substrate using spray coating. The typical equipment for spray coating comprises a spray nozzle, an atomizer, a precursor solution, and a carrier gas. In the spray deposition process, a precursor solution is pulverized into micro sized drops by means of a carrier gas or by atomization (e.g., ultrasonic, air blast, or electrostatic). The droplets that come out of the atomizer are accelerated by the substrate surface through the nozzle by help of the carrier gas which is controlled and regulated as desired. Relative motion between the spray nozzle and the substrate is defined by design for the purpose of full coverage on the substrate.

In some embodiments, application of the nanostructure composition further comprises a solvent. In some embodiments, the solvent for application of the nanostructure composition is water, organic solvents, inorganic solvents, halogenated organic solvents, or mixtures thereof. Illustrative solvents include, but are not limited to, water, D20, acetone, ethanol, dioxane, ethyl acetate, methyl ethyl ketone, isopropanol, anisole, γ-butyrolactone, dimethylformamide, N-methylpyrroldinone, dimethylacetamide, hexamethylphosphoramide, toluene, dimethylsulfoxide, cyclopentanone, tetramethylene sulfoxide, xylene, g-caprolactone, tetrahydrofuran, tetrachloroethylene, chloroform, chlorobenzene, dichloromethane, 1,2-dichloroethane, 1,1,2,2-tetrachloroethane, or mixtures thereof.

In some embodiments, the nanostructure compositions are thermally cured to form the nanostructure layer. In some embodiments, the compositions are cured using UV light. In some embodiments, the nanostructure composition is coated directly onto a barrier layer of a nanostructure film, and an additional barrier layer is subsequently deposited upon the nanostructure layer to create the nanostructure film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are preferably deposited over a nanostructure layer to seal the material between the top and bottom barrier layers. Suitably, the barrier layers can be deposited as a laminate film and optionally sealed or further processed, followed by incorporation of the nanostructure film into the particular lighting device. The nanostructure composition deposition process can include additional or varied components, as will be understood by persons of ordinary skill in the art. Such embodiments will allow for in-line process adjustments of the nanostructure emission characteristics, such as brightness and color (e.g., to adjust the quantum film white point), as well as the nanostructure film thickness and other characteristics. Additionally, these embodiments will allow for periodic testing of the nanostructure film characteristics during production, as well as any necessary toggling to achieve precise nanostructure film characteristics. Such testing and adjustments can also be accomplished without changing the mechanical configuration of the processing line, as a computer program can be employed to electronically change the respective amounts of mixtures to be used in forming a nanostructure film.

Barrier Layers

In some embodiments, the nanostructure molded article comprises one or more barrier layers disposed on either one or both sides of the nanostructure layer. Suitable barrier layers protect the nanostructure layer and the nanostructure molded article from environmental conditions such as high temperatures, oxygen, and moisture. Suitable barrier materials include non-yellowing, transparent optical materials which are hydrophobic, chemically and mechanically compatible with the nanostructure molded article, exhibit photo- and chemical-stability, and can withstand high temperatures. Preferably, the one or more barrier layers are index-matched to the nanostructure molded article. In preferred embodiments, the matrix material of the nanostructure molded article and the one or more adjacent barrier layers are index-matched to have similar refractive indices, such that most of the light transmitting through the barrier layer toward the nanostructure molded article is transmitted from the barrier layer into the nanostructure layer. This index-matching reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are preferably planar layers, and can include any suitable shape and surface area configuration, depending on the particular lighting application. In preferred embodiments, the one or more barrier layers will be compatible with laminate film processing techniques, whereby the nanostructure layer is disposed on at least a first barrier layer, and at least a second barrier layer is disposed on the nanostructure layer on a side opposite the nanostructure layer to form the nanostructure molded article according to one embodiment. Suitable barrier materials include any suitable barrier materials known in the art. For example, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. Preferably, each barrier layer of the nanostructure molded article comprises at least 2 layers comprising different materials or compositions, such that the multi-layered barrier eliminates or reduces pinhole defect alignment in the barrier layer, providing an effective barrier to oxygen and moisture penetration into the nanostructure layer. The nanostructure layer can include any suitable material or combination of materials and any suitable number of barrier layers on either or both sides of the nanostructure layer. The materials, thickness, and number of barrier layers will depend on the particular application, and will suitably be chosen to maximize barrier protection and brightness of the nanostructure layer while minimizing thickness of the nanostructure molded article. In preferred embodiments, each barrier layer comprises a laminate film, preferably a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the nanostructures comprise heavy metals or other toxic materials, which guidelines may require more or thicker barrier layers. Additional considerations for the barriers include cost, availability, and mechanical strength.

In some embodiments, the nanostructure film comprises two or more barrier layers adjacent each side of the nanostructure layer, for example, two or three layers on each side or two barrier layers on each side of the nanostructure layer. In some embodiments, each barrier layer comprises a thin glass sheet, e.g., glass sheets having a thickness of about 100 µm, 100 µm or less, or 50 µm or less.

Each barrier layer of the nanostructure film can have any suitable thickness, which will depend on the particular requirements and characteristics of the lighting device and application, as well as the individual film components such as the barrier layers and the nanostructure layer, as will be understood by persons of ordinary skill in the art. In some embodiments, each barrier layer can have a thickness of 50 µm or less, 40 µm or less, 30 µm or less, 25 µm or less, 20 µm or less, or 15 µm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10 µm or less, 5 µm or less, 1 µm or less, or 100 nm or less. In certain embodiments, the barrier comprises a thin oxide coating with a thickness of about 100 nm or less, 10 nm or less, 5 nm or less, or 3 nm or less. The top and/or bottom barrier can consist of the thin oxide coating, or may comprise the thin oxide coating and one or more additional material layers.

Adhesive Properties of the Nanostructure Films

The peel resistance of the nanostructure film is measured using the standard test method advanced by the American Society for Testing and Materials. ASTM D1876-01 (2008), Standard Test Method for Peel Resistance of Adhesives (T-Peel Test), ASTM International, West Conshohocken, PA, 2008. The T-Peel Test measures the relative peel resistance of adhesive bonds between flexible adherends by means of a T-type specimen.

"Peel strength" (n) is the average load per unit width of bond line required to produce progressive separation of two bonded, flexible adherends, under standard conditions.

"Flexible" as used herein means that the adherends have such dimensions and physical properties as to permit bending them through any angle up to 900 without breaking or cracking.

Under the T-Peel Test, test specimen laminated panels are tested using a tension testing machine with application of a load at a constant head speed of 254 mm (10 in)/min. An autographic recording of the load versus head movement or load versus distance peeled over at least a 127 mm (5-inch) length of the bond line after the initial peak. From the autographic curve for the first 127 mm of peeling after the initial peak it is possible to calculate peeling in pounds per inch of the specimen width required to separate the adherends. It is preferred that the average be determined from the curve with a planimeter.

In some embodiments, the nanostructure film layer has a mean peel strength of between about 0.35 lbs/in and about 5 lbs/in, about 0.35 lbs/in and about 3 lbs/in, about 0.35 lbs/in and about 2 lbs/in, about 0.35 lbs/in and about 1.5 lbs/in, about 0.35 lbs/in and about 1 lbs/in, about 0.35 lbs/in and about 0.75 lbs/in, about 0.35 lbs/in and about 0.5 lbs/in, about 0.5 lbs/in and about 5 lbs/in, about 0.5 lbs/in and about 3 lbs/in, about 0.5 lbs/in and about 2 lbs/in, about 0.5 lbs/in and about 1.5 lbs/in, about 0.5 lbs/in and about 1 lbs/in, about 0.5 lbs/in and about 0.75 lbs/in, about 0.75 lbs/in and about 5 lbs/in, about 0.75 lbs/in and about 3 lbs/in, about 0.75 lbs/in and about 2 lbs/in, about 0.75 lbs/in and about 1.5 lbs/in, about 0.75 lbs/in and about 1 lbs/in, about 1 lbs/in and about 5 lbs/in, about 1 lbs/in and about 3 lbs/in, about 1 lbs/in and about 2 lbs/in, about 1 lbs/in and about 1.5 lbs/in, about 1.5 lbs/in and about 5 lbs/in, about 1.5 lbs/in and about 3 lbs/in, about 1.5 lbs/in and about 2 lbs/in, about 2 lbs/in and about 5 lbs/in, about 2 lbs/in and about 3 lbs/in, or about 3 lbs/in and about 5 lbs/in.

In some embodiments, the nanostructure film layer has a mean peel strength of between about 158 g/in and about 2,268 g/in, about 158 g/in and about 1361 g/in, about 158 g/in and about 907 g/in, about 158 g/in and about 680 g/in, about 158 g/in and about 454 g/in, about 158 g/in and about 340 g/in, about 158 g/in and about 227 g/in, about 227 g/in and about 2,268 g/in, about 227 g/in and about 1361 g/in, about 227 g/in and about 907 g/in, about 227 g/in and about 680 g/in, about 227 g/in and about 454 g/in, about 227 g/in and about 340 g/in, about 340 g/in and about 2,268 g/in, about 340 g/in and about 1361 g/in, about 340 g/in and about 907 g/in, about 340 g/in and about 680 g/in, about 340 g/in and about 454 g/in, about 454 g/in and about 2,268 g/in, about 454 g/in and about 1361 g/in, about 454 g/in and about 907 g/in, about 454 g/in and about 680 g/in, about 680 g/in and about 2,268 g/in, about 680 g/in and about 1361 g/in, about 680 g/in and about 907 g/in, about 1361 g/in and about 2,268 g/in, about 1361 g/in and about 1361 g/in, or about 1361 g/in and about 2,268 g/in.

Nanostructure Film Features and Embodiments

In some embodiments, the nanostructure films are used to form display devices. As used herein, a display device refers to any system with a lighting display. Such devices include, but are not limited to, devices encompassing a liquid crystal display (LCD), televisions, computers, mobile phones, smart phones, personal digital assistants (PDAs), gaming devices, electronic reading devices, digital cameras, and the like.

In some embodiments, the optical films containing nanostructure compositions are substantially free of cadmium. As used herein, the term "substantially free of cadmium" is intended that the nanostructure compositions contain less than 100 ppm by weight of cadmium. The RoHS compliance definition requires that there must be no more than 0.01% (100 ppm) by weight of cadmium in the raw homogeneous precursor materials. The cadmium concentration can be measured by inductively coupled plasma mass spectroscopy (ICP-MS) analysis, and are on the parts per billion (ppb) level. In some embodiments, optical films that are "substantially free of cadmium" contain 10 to 90 ppm cadmium. In other embodiment, optical films that are substantially free of cadmium contain less than about 50 ppm, less than about 20 ppm, less than about 10 ppm, or less than about 1 ppm of cadmium.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Preparation of Quantum Dot Films Using DIOPA
Materials:
  Pentaerythritol tetrakis (3-mercaptopropionate) (PETMP): 488.66 g/mol
  Triallyl triazine trione (with 1000 ppm 4-Hydroxy-tempo (TTT w/HyT)): 249.27 g/mol
  2,4,6-Trimethylbenzoylphenyl phosphinate (TPO-L): 316.33 g/mol
  Diisooctylphosphinic acid (DIOPA): 290.42 g/mol
  Green quantum dot concentrate (optical density=35) in aminosilicone (Gr QDC, Nanosys, Inc., Milpitas, CA): 4,500-6,000 MW
  Red quantum dot concentrate (optical density=60) in aminosilicone (R QDC, Nanosys, Inc., Milpitas, CA): 4,500-6,000 MW
  Optical-grade barrier film
Equipment:
  Planetary vacuum mixer
  Dymax UV curing light (365 nm metal halide)
  Benchtop coating system with UV LED 315-400 nm To a disposable mixing cup was added 6 g (12 mmol) of PTMP, 4 g (16 mmol) of TTT w/HyT, 0.43 g green quantum dot concentrate, 0.14 g red quantum dot concentrate, and 0.1 g (0.32 mmol) of TPO-L. The mixture was mixed in a planetary vacuum mixer at 2000 rpm for 2 minutes. 0.05 g (0.17 mmol) of DIOPA was added followed by mixing in a planetary vacuum mixer at 2000 rpm for 2 minutes. Using a benchtop coating system, approximately 4 g of the mixed formulation was coated at a thickness of 100 μm between two sheets of optical-grade barrier film at an initial curing dose of 480 mJ/cm². The coated formulation underwent a final cure under a Dymax UV curing light at 70 mW/cm² for 20 seconds. All steps were conducted at room temperature.

The method was repeated for the following amounts of DIOPA: 0 g (used as a control), 0.1 g (0.34 mmol), and 0.2 g (0.69 mmol).

Testing

To determine the adhesive force between the coated quantum dot matrix and the barrier film, a peel strength test was conducted using a modified version of ASTM D 1876. Results are shown in TABLE 1.

TABLE 1

Results of Adhesion Test with DIOPA

| DIOPA Amount | Adhesion Test 1 (lbs/in) | Adhesion Test 2 (lbs/in) | Mean (lbs/in) | Standard Deviation (lbs/in) |
|---|---|---|---|---|
| 0 | 0.095 | 0.095 | 0.095 | 0 |
| 0.5% | 0.185 | 0.16 | 0.17 | 0.011 |
| 1% | 0.36 | 0.30 | 0.33 | 0.032 |
| 2% | 0.55 | 0.55 | 0.55 | 0 |

FIG. 1 shows the results of the peel strength test for the control quantum dot layer and quantum dot layers with three concentrations of DIOPA: 0.5%, 1%, and 2%. As shown in FIG. 1, peel strength increases with increasing concentrations of DIOPA.

Example 2

Preparation of Quantum Dot Films Using Oxalic Acid
Materials:
  Pentaerythritol tetrakis (3-mercaptopropionate) (PETMP): 488.66 g/mol
  Triallyl triazine trione (with 1000 ppm 4-Hydroxy-tempo (TTT w/HyT): 249.27 g/mol
  2,4,6-Trimethylbenzoylphenyl phosphinate (TPO-L): 316.33 g/mol
  Oxalic acid (10% w/w solution in acetone): 90.03 g/mol
  Green quantum dot concentrate (optical density=35) in aminosilicone (Gr QDC, Nanosys, Inc., CA): 4,500-6,000 MW
  Red quantum dot concentrate (optional density=60) in aminosilicone (R QDC, Nanosys, Inc., CA): 4,500-6,000 MW
  Optical-grade barrier film
Equipment:
  Planetary vacuum mixer
  Dymax UV curing light (365 nm metal halide)
  Benchtop coating system with UV LED 315-400 nm To a disposable mixing cup was added 6 g (12 mmol) of PTMP, 4 g (16 mmol) of TTT w/HyT, 0.43 g green quantum dot concentrate, 0.14 g red quantum dot concentrate, and 0.1 g (0.32 mmol) of TPO-L. The mixture was mixed in a planetary vacuum mixer at 2000 rpm for 2 minutes. 0.05 g (0.56 mmol) of oxalic acid (10% w/w solution in acetone) was added followed by mixing in a planetary vacuum mixer at 2000 rpm for 2 minutes. Using a benchtop coating system, approximately 4 g of the mixed formulation was coated at a thickness of 100 μm between two sheets of optical-grade barrier film at an initial curing dose of 480 mJ/cm². The coated formulation underwent a final cure under a Dymax UV curing light at 70 mW/cm² for 20 seconds. All steps were conducted at room temperature.

The method was repeated for the following amounts of oxalic acid: 0 g (used as a control), 0.25 g (2.8 mmol), and 0.5 g (5.6 mmol).

Testing

To determine the adhesive force between the coated quantum dot matrix and the barrier film, a peel strength test was conducted using a modified version of ASTM D 1876. Results are shown in TABLE 2.

TABLE 2

Results of Adhesion Test with Oxalic Acid

| Oxalic Acid Amount | Maximum (lbs/in) | Average (lbs/in) | Mean (lbs/in) | Standard Deviation (lbs/in) |
|---|---|---|---|---|
| 0 | 0.13 | 0.11 | 0.11 | 0 |
| 0.05% | 0.39 | 0.42 | 0.42 | 0 |
| 0.25% | 0.64 | 0.65 | 0.65 | 0 |
| 0.5% | 1.37 | 1.77 | 1.77 | 0 |

Figure 2:
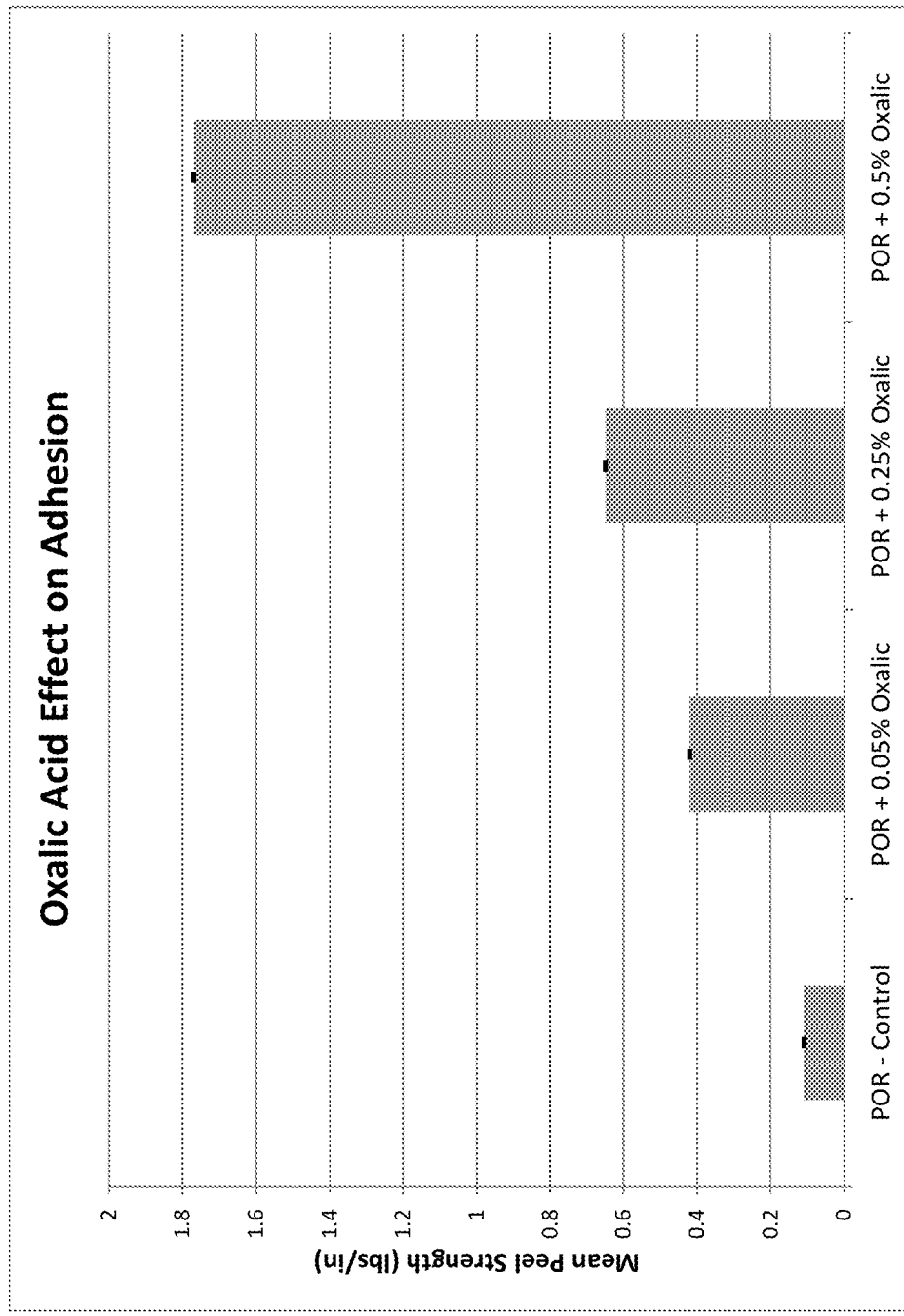
FIG. 2 is a graph showing the mean peel strength of a quantum dot film layer prepared with no acid (control), a quantum dot film layer prepared with 0.05% oxalic acid, a quantum dot film layer prepared with 0.25% oxalic acid, and a quantum dot film layer prepared with 0.5% oxalic acid.

FIG. 2 shows the results of the peel strength test for the control quantum dot layer and quantum dot layers with three concentrations of oxalic acid: 0.05%, 0.25%, and 0.5%. As shown in FIG. 2, peel strength increases with increasing concentrations of oxalic acid.

Example 3

Preparation of Quantum Dot Films Using Oleic Acid

Materials:
 Pentaerythritol tetrakis (3-mercaptopropionate) (PTMP): 488.66 g/mol
 Triallyl triazine trione (with 1000 ppm 4-Hydroxy-tempo (TTT w/HyT): 249.27 g/mol
 2,4,6-Trimethylbenzoylphenyl phosphinate (TPO-L): 316.33 g/mol
 Oleic acid (10% w/w in acetone): 282.46 g/mol
 Green quantum dot concentrate (optical density=35) in aminosilicone (Gr QDC, Nanosys, Inc., Milpitas, CA): 4,500-6,000 MW
 Red quantum dot concentrate (optical density=60) in aminosilicone (R QDC, Nanosys, Inc., Milpitas, CA): 4,500-6,000 MW
 Optical-grade barrier film Equipment:
 Planetary vacuum mixer
 Dymax UV curing light (365 nm metal halide)
 Benchtop coating system with UV LED 315-400 nm To a disposable mixing cup was added 6 g (12 mmol) of PTMP, 4 g (16 mmol) of TTT w/HyT, 0.43 g green quantum dot concentrate, 0.14 g red quantum dot concentrate, and 0.1 g (0.32 mmol) of TPO-L. The mixture was mixed in a planetary vacuum mixer at 2000 rpm for 2 minutes. 0.025 g (0.089 mmol) of oleic acid (10% w/w in acetone) was added followed by mixing in a planetary vacuum mixer at 2000 rpm for 2 minutes. Using a benchtop coating system, approximately 4 g of the mixed formulation was coated at a thickness of 100 μm between two sheets of optical-grade barrier film at an initial curing dose of 480 mJ/cm². The coated formulation underwent a final cure under a Dymax UV curing light at 70 mW/cm² for 20 seconds. All steps were conducted at room temperature.

The method was repeated for the following amounts of oleic acid: 0 g (used as a control) and 0.125 g (0.44 mmol).

Testing

To determine the adhesive force between the coated quantum dot matrix and barrier film, a peel strength test was conducted using a modified version of ASTM D 1876. Results are shown in TABLE 3.

TABLE 3

Results of Adhesion Test with Oleic Acid

| Oleic Acid Amount | Maximum (lbs/in) | Average (lbs/in) | Mean (lbs/in) | Standard Deviation (lbs/in) | Adhesion (g/inch) |
|---|---|---|---|---|---|
| 0 | 0.28 | 0.2 | 0.2 | 0 | 90.8 |
| 0.25% | 0.38 | 0.35 | 0.35 | 0 | 158.9 |
| 1.25% | 0.78 | 0.89 | 0.89 | 0 | 404.06 |

FIG. 3 shows the results of the peel strength test for the control quantum dot layer and quantum dot layers with two concentrations of oleic acid: 0.25%, and 1.25%. As shown in FIG. 3, peel strength increases with increasing concentrations of oleic acid.

Example 4

Preparation of Quantum Dot Films Using Octanoic Acid and Propionic Acid

Using the method of Example 1, quantum dot films were prepared using 0.25% octanoic acid, 2.5% octanoic acid, 0.25% propanoic acid, and 1.25% propanoic acid.

To determine the adhesive force between the coated quantum dot matrix and barrier film, a peel strength test was conducted using a modified version of ASTM D 1876. Results are shown in TABLE 4.

TABLE 4

Results of Adhesion Test with Octanoic Acid and Propanoic Acid

| Acid Amount | Maximum (lbs/in) | Average (lbs/in) | Mean (lbs/in) | Standard Deviation (lbs/in) | Adhesion (g/inch) |
|---|---|---|---|---|---|
| 0 | 0.28 | 0.2 | 0.2 | 0 | 90.8 |
| 0.25% octanoic acid | 0.49 | 0.65 | 0.65 | 0 | 295.1 |
| 2.5% octanoic acid | 0.87 | 1.29 | 1.29 | 0 | 585.66 |
| 0.25% propanoic acid | 0.38 | 0.31 | 0.31 | 0 | 140.74 |
| 2.5% propanoic acid | 0.76 | 1.07 | 1.07 | 0 | 485.78 |

FIG. 3 shows the results of a peel strength test for quantum dot film layers with two concentrations of octanoic acid: 0.25% and 2.5% and two concentrations of propanoic acid: 0.25% and 1.25%. As shown in FIG. 3, peel strength increases with increasing concentrations of octanoic acid and propanoic acid.

Example 5

Preparation of Quantum Dot Films Using Octanoic Acid and Decanoic Acid

Using the method of Example 1, quantum dot films were prepared using 0.25% octanoic acid, 0.75% octanoic acid, 1.25% octanoic acid, 0.25% decanoic acid, 0.75% decanoic acid, and 1.25% decanoic acid.

To determine the adhesive force between the coated quantum dot matrix and barrier film, a peel strength test was conducted using a modified version of ASTM D 1876. Results are shown in TABLE 5.

TABLE 5

Results of Adhesion Test with Octanoic Acid and Decanoic Acid

| Acid Amount | Maximum (lbs/in) | Average (lbs/in) | Mean (lbs/in) | Standard Deviation (lbs/in) | Adhesion (g/inch) |
|---|---|---|---|---|---|
| 0 | 0.27 | 0.26 | 0.26 | 0 | 118.04 |
| 0.25% octanoic acid | 0.5 | 0.47 | 0.47 | 0 | 213.38 |
| 0.75% octanoic acid | 0.68 | 1.23 | 1.23 | 0 | 558.42 |
| 1.25% octanoic acid | 3.03 | 1.6 | 1.6 | 0 | 726.4 |
| 0.25% decanoic acid | 0.49 | 0.43 | 0.43 | 0 | 195.22 |
| 0.75% decanoic acid | 0.84 | 0.74 | 0.74 | 0 | 335.96 |
| 1.25% decanoic acid | 1.68 | 1.32 | 1.32 | 0 | 599.28 |

FIG. 4 shows the results of a peel strength test for quantum dot film layers with three concentrations of octanoic acid: 0.25%, 0.75%, and 1.25% and three concentrations of propanoic acid: 0.25%, 0.75%, and 1.25%. As shown in FIG. 4, peel strength increases with increasing concentrations of octanoic acid and decanoic acid.

While various embodiments have been described above, it should be understood that they have been presented by way of example only, and not limitation. It will be apparent to persons skilled in the relevant art that various changes in form and detail can be made without departing from the spirit and scope of the invention. Thus, the breadth and scope should not be limited by any of the above-described exemplary embodiments, but should be defined only in accordance with the following claims and their equivalents.

As will be understood by persons of ordinary skill in the art, any of the foregoing device and/or processing components can be used in any suitable combination to form the QD film.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A nanostructure film layer comprising:
   (a) at least one population of nanostructures;
   (b) at least one aminosilicone polymer; and
   (c) at least one organic resin;
   wherein the nanostructure film layer has a mean peel strength of between about 0.35 lbs/in and about 5 lbs/in, and wherein between about 1% and about 100% of the amine groups of the at least one aminosilicone polymer are complexed to cations.

2. The nanostructure film layer of claim 1, wherein the at least one population of nanostructures comprises two populations of nanostructures.

3. The nanostructure film layer of claim 1, wherein the at least one population of nanostructures includes a core selected from the group consisting of InP, InZnP, InGaP, CdSe, CdS, CdSSe, CdZnSe, CdZnS, ZnSe, ZnSSe, InAs, InGaAs, or InAsP.

4. The nanostructure film layer of claim 1, wherein the at least one population of nanostructures comprises between about 0.0001% and about 2% of a total weight of the nanostructure film layer.

5. The nanostructure film layer of claim 1, wherein the at least one aminosilicone polymer comprises between one and five aminosilicone polymers.

6. The nanostructure film layer of claim 1, wherein the at least one aminosilicone polymer comprises two aminosilicone polymers.

7. The nanostructure film layer of claim 1, wherein the at least one aminosilicone polymer comprises between about 0.01% and about 50% of a total weight of the nanostructure film layer.

8. The nanostructure film layer of claim 1, wherein between about 1% and about 40% of the amine groups in the at least one aminosilicone polymer are complexed to the cations.

9. The nanostructure film layer of claim 1, wherein the at least one organic resin comprises between one and five organic resins.

10. The nanostructure film layer of claim 1, wherein the at least one organic resin comprises two organic resins.

11. The nanostructure film layer of claim 1, wherein the at least one organic resin is a thermosetting resin or a UV curable resin.

12. The nanostructure film layer of claim 1, wherein the at least one organic resin is a UV curable resin.

13. A nanostructure film layer comprising:
   (a) at least one population of nanostructures;
   (b) at least one aminosilicone polymer; and
   (c) at least one organic resin;
   wherein the nanostructure film layer has a mean peel strength of between about 0.35 lbs/in and about 5 lbs/in,
   wherein between about 1% and about 100% of the amine groups of the at least one aminosilicone polymer are complexed to cations, and
   wherein the at least one organic resin is a mercaptofunctional compound.

14. The nanostructure film layer of claim 1, wherein the at least one organic resin is an isocyanate, an epoxy, or an unsaturated compound.

15. The nanostructure film layer of claim 1, wherein the at least one organic resin comprises between 5% and 50% of a total weight of the nanostructure film layer.

16. The nanostructure film layer of claim 1, wherein the nanostructure film layer has a mean peel strength of between about 0.5 lbs/in and about 5 lbs/in.

17. The nanostructure film layer of claim 1, wherein the nanostructure film layer has a mean peel strength of between about 0.75 lbs/in and about 5 lbs/in.

18. The nanostructure film layer of claim 1, wherein the nanostructure film layer comprises two populations of nanostructures, two aminosilicone polymers, one acid, and two organic resins.

19. The nanostructure film layer of claim 1, wherein the at least one population of nanostructures comprise quantum dots.

20. The nanostructure film layer of claim 19, wherein the quantum dots comprise InP and/or CdSe quantum dots.

* * * * *